(12) United States Patent
Lee et al.

(10) Patent No.: US 12,301,966 B2
(45) Date of Patent: May 13, 2025

(54) CAMERA MODULE ENCLOSURE

(71) Applicant: LG INNOTEK CO., LTD., Seoul (KR)

(72) Inventors: Min Woo Lee, Seoul (KR); Kyeong Mok Yoon, Seoul (KR); Seung Man Jeong, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 112 days.

(21) Appl. No.: 18/009,521

(22) PCT Filed: Jun. 24, 2021

(86) PCT No.: PCT/KR2021/007979
§ 371 (c)(1),
(2) Date: Dec. 9, 2022

(87) PCT Pub. No.: WO2021/261943
PCT Pub. Date: Dec. 30, 2021

(65) Prior Publication Data
US 2023/0244125 A1 Aug. 3, 2023

(30) Foreign Application Priority Data

Jun. 25, 2020 (KR) .................. 10-2020-0077622
Dec. 10, 2020 (KR) .................. 10-2020-0172218

(51) Int. Cl.
| | | |
|---|---|---|
| *H04N 23/52* | (2023.01) | |
| *G03B 17/08* | (2021.01) | |
| *G03B 17/55* | (2021.01) | |
| *G03B 30/00* | (2021.01) | |
| *H04N 23/55* | (2023.01) | |

(52) U.S. Cl.
CPC ............. *H04N 23/52* (2023.01); *G03B 17/08* (2013.01); *G03B 17/55* (2013.01); *G03B 30/00* (2021.01); *H04N 23/55* (2023.01)

(58) Field of Classification Search
CPC ........ H04N 23/52; H04N 23/55; H04N 23/57; G03B 17/08; G03B 17/55; G03B 30/00; G03B 3/10; G03B 17/12
See application file for complete search history.

(56) References Cited

U.S. PATENT DOCUMENTS

2009/0021635 A1  1/2009 Cheng
2016/0344912 A1* 11/2016 Baik ...................... H04N 23/55
(Continued)

FOREIGN PATENT DOCUMENTS

EP    3 633 447 A1   4/2020
JP    2009-38445 A   2/2009
(Continued)

*Primary Examiner* — Gevell V Selby
(74) *Attorney, Agent, or Firm* — Birch, Stewart, Kolasch & Birch, LLP

(57) ABSTRACT

A camera module comprises: a first body including an upper plate and a side plate extending from the upper plate; a second body coupled to the first body; a lens module, at least a portion of which is placed inside the first body; a first shield cover coupled to the first body; and a substrate assembly placed inside the second body, wherein at least a portion of the first shield cover is placed at a higher position than the upper plate of the first body and revealed to the outside.

18 Claims, 32 Drawing Sheets

(56) References Cited

U.S. PATENT DOCUMENTS

| | | | |
|---|---|---|---|
| 2018/0284567 A1 | 10/2018 | Minamisawa et al. | |
| 2019/0033553 A1 | 1/2019 | Jeong | |
| 2020/0116994 A1 | 4/2020 | Gu et al. | |
| 2020/0145560 A1* | 5/2020 | Han | H04N 23/51 |
| 2021/0314465 A1* | 10/2021 | Park | H04N 23/55 |
| 2021/0364729 A1* | 11/2021 | Lee | H04N 23/54 |

FOREIGN PATENT DOCUMENTS

| | | |
|---|---|---|
| JP | 2013-164602 A | 8/2013 |
| JP | 2015-34911 A | 2/2015 |
| JP | 2018-169495 A | 11/2018 |
| KR | 10-2010-0112810 A | 10/2010 |
| KR | 10-2018-0053895 A | 5/2018 |
| KR | 10-2020-0042983 A | 4/2020 |

\* cited by examiner

CAMERA MODULE ENCLOSURE

CROSS REFERENCE TO RELATED APPLICATIONS

This application is the National Phase of PCT International Application No. PCT/KR2021/007979, filed on Jun. 24, 2021, which claims priority under 35 U.S.C. 119 (a) to Patent Application No. 10-2020-0077622, filed in the Republic of Korea on Jun. 25, 2020, and Patent Application No. 10-2020-0172218, filed in the Republic of Korea on Dec. 10, 2020, all of which are hereby expressly incorporated by reference into the present application.

TECHNICAL FIELD

The present embodiment relates to a camera module.

BACKGROUND ART

Recently, ultra-small camera modules are being developed, and ultra-small camera modules are widely used in small electronic products such as smartphones, laptops, and game consoles.

As the spread of automobiles becomes more popular, ultra-small cameras are widely used not only in small electronic products but also in vehicles. For example, black box cameras for vehicle protection or objective data of traffic accidents, rear surveillance cameras that allow drivers to monitor blind spots at the rear of the vehicle through screens to ensure safety when reversing the vehicle, and peripheral detection cameras capable of monitoring the surroundings of the vehicle, and the like are provided.

Recently, as the camera module has become high-pixel, the heat dissipation performance of the plastic body has become a problem. In particular, the conventional plastic body has a lower unit price than a metal body, however, is vulnerable to heat dissipation, so that a high-pixel camera module has a problem in that the product is deteriorated as it is used.

DETAILED DESCRIPTION OF THE INVENTION

Technical Subject

The present invention is intended to provide a camera module capable of maximizing heat dissipation performance and minimizing a waterproof problem.

In addition, the present invention is intended to provide a camera module that minimizes assembly man-hours and reduces costs.

Technical Solution

A camera module according to the present embodiment comprises: a first body including an upper plate and a side plate being extended from the upper plate; a second body being coupled to the first body; a lens module, at least a portion thereof is disposed inside the first body; a first shield cover being coupled to the first body; and a substrate assembly being disposed inside the second body, wherein at least a portion of the first shield cover is disposed higher than the upper plate of the first body and exposed to the outside.

The first shield cover includes an upper plate and a side plate being extended from the upper plate, wherein the side plate of the first shield cover includes a first portion being coupled to the upper plate of the first body, and a second portion being extended upwardly from the first portion, and wherein the second portion of the first shield cover may not be overlapped with the upper plate of the first body in a direction perpendicular to the optical axis direction.

The length of the first portion of the first shield cover in the optical axis direction may be shorter than the length of the second portion of the first shield cover in the optical axis direction.

The first portion of the side plate of the first shield cover may be coupled to the first body by insert injection.

The first body may include a coupling portion being protruded upward from the upper plate of the first body, wherein the coupling portion of the first body may be disposed in the second portion of the side plate of the first shield cover.

The coupling portion of the first body may include a first area having a first width in a direction perpendicular to the optical axis direction, and a second area being extended upward from the first area and having a second width smaller than the first width.

The coupling part of the first body may be coupled to the second portion of the first shield cover by insert injection.

The second area of the coupling part of the first body includes a plurality of second areas, wherein the coupling part of the first body includes a groove being formed between the plurality of second areas, and wherein the groove of the coupling part of the first body may be disposed at a corner being disposed between the side plates of the first shield cover.

It includes a second shield cover being disposed inside the second body, wherein the second shield cover includes a bottom plate and a side plate being extended from the bottom plate, wherein the thickness of the side plate of the first shield cover in a direction perpendicular to the optical axis direction may be greater than the thickness of the side plate of the second shield cover in a corresponding direction.

The second shield cover may be spaced apart from the first shield cover in the optical axis direction.

Advantageous Effects

According to the present invention, it is possible to provide a plastic rear body structure capable of maximizing heat dissipation.

In addition, it is possible to minimize assembly man-hours and reduce costs by assembling the cover made of a metal material and the body made of a plastic material by insert injection.

In addition, it is possible to prevent interfacial separation between the cover and the rear body through a pretreatment process on the cover, thereby maximizing the waterproof performance.

In addition, by forming a hole for exposing the shield can inside the body to the outside, heat inside the camera module can be effectively discharged to the outside.

EMBODIMENT

Hereinafter, preferred embodiments of the present invention will be described in detail with reference to the accompanying drawings.

However, the technical idea of the present invention is not limited to some embodiments to be described, but may be implemented in various forms, and within the scope of the technical idea of the present invention, one or more of the constituent elements may be selectively combined or substituted between embodiments.

In addition, the terms (including technical and scientific terms) used in the embodiments of the present invention, unless explicitly defined and described, can be interpreted as a meaning that can be generally understood by a person skilled in the art, and commonly used terms such as terms defined in the dictionary may be interpreted in consideration of the meaning of the context of the related technology.

In addition, terms used in the present specification are for describing embodiments and are not intended to limit the present invention.

In the present specification, the singular form may include the plural form unless specifically stated in the phrase, and when described as "at least one (or more than one) of A and B and C", it may include one or more of all combinations that can be combined with A, B, and C.

In addition, in describing the components of the embodiment of the present invention, terms such as first, second, A, B, (a), and (b) may be used. These terms are merely intended to distinguish the components from other components, and the terms do not limit the nature, order or sequence of the components.

And, when a component is described as being 'connected', 'coupled' or 'interconnected' to another component, the component is not only directly connected, coupled or interconnected to the other component, but may also include cases of being 'connected', 'coupled', or 'interconnected' due that another component between that other components.

In addition, when described as being formed or arranged in "on (above)" or "below (under)" of each component, "on (above)" or "below (under)" means that it includes not only the case where the two components are directly in contact with, but also the case where one or more other components are formed or arranged between the two components. In addition, when expressed as "on (above)" or "below (under)", the meaning of not only an upward direction but also a downward direction based on one component may be included.

Hereinafter, another camera module in the present embodiment will be described in more detail according to the accompanying drawings.

Figure 1:
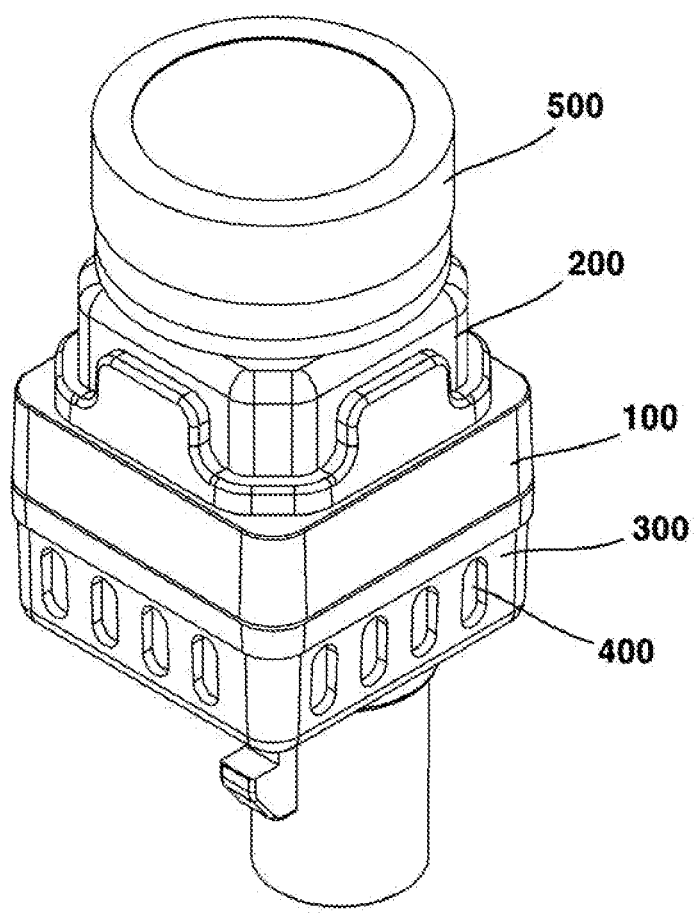
FIG. 1 is a perspective view of a camera module according to the present embodiment.
Figure 2:
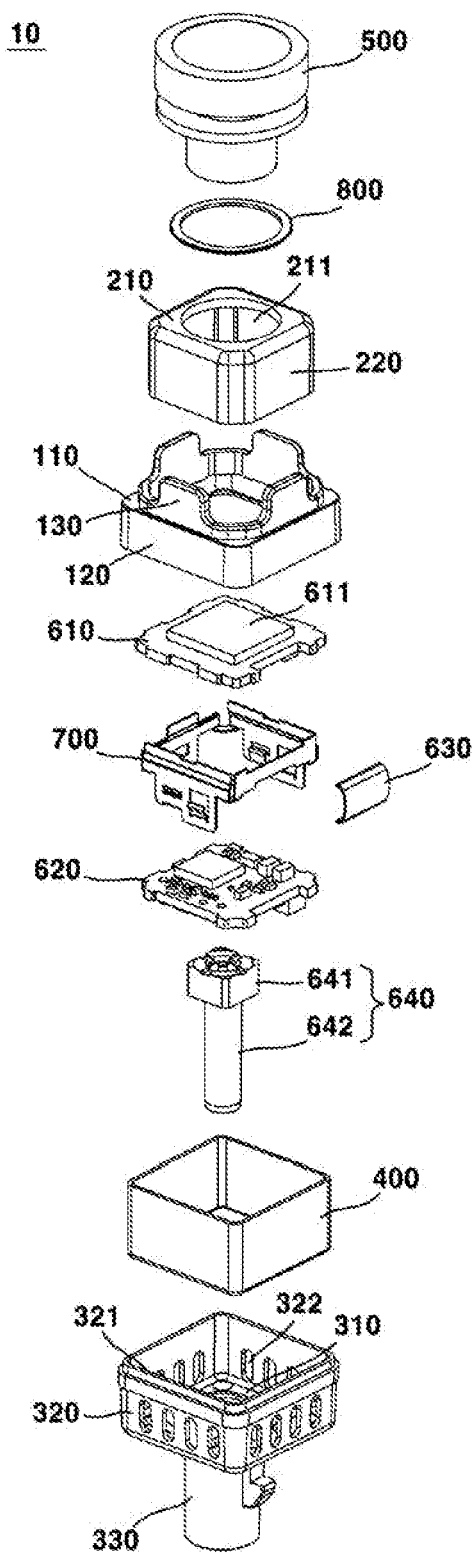
FIG. 2 is an exploded perspective view of a camera module according to the present embodiment.
Figure 3:
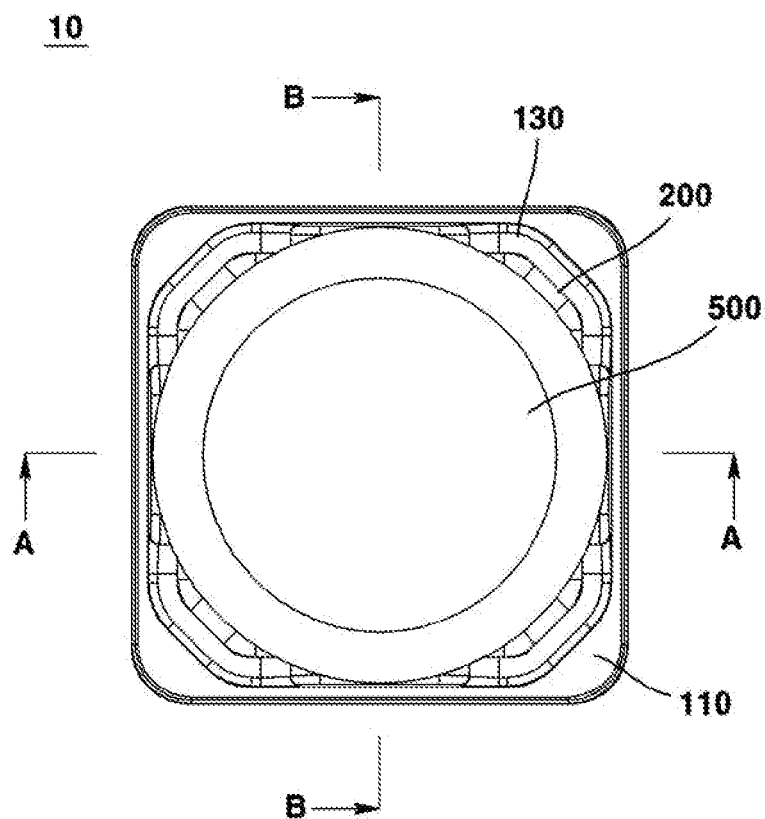
FIG. 3 is a plan view of a camera module according to the present embodiment.
Figure 4:
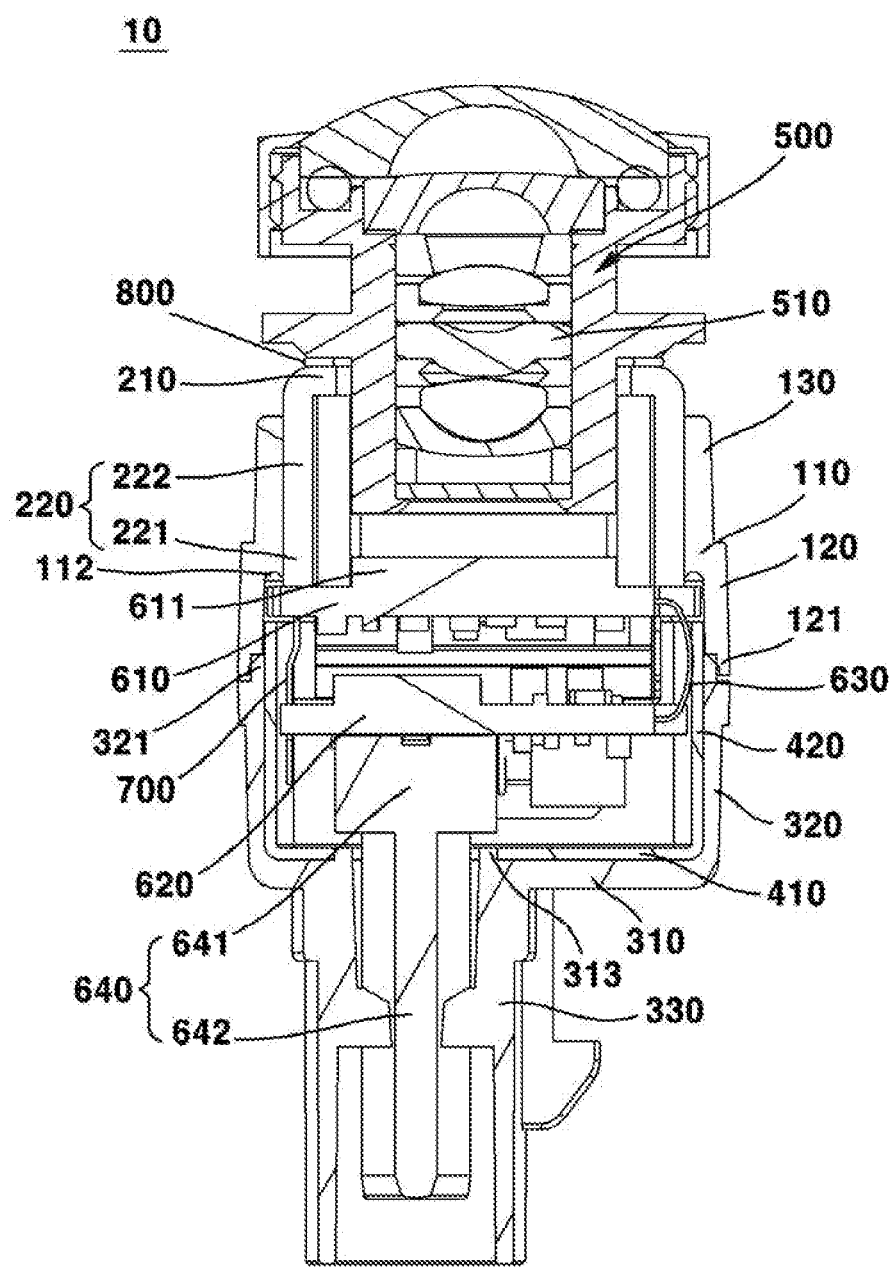
FIG. 4 is a cross-sectional view taken along line A-A of FIG. 3.
Figure 5:
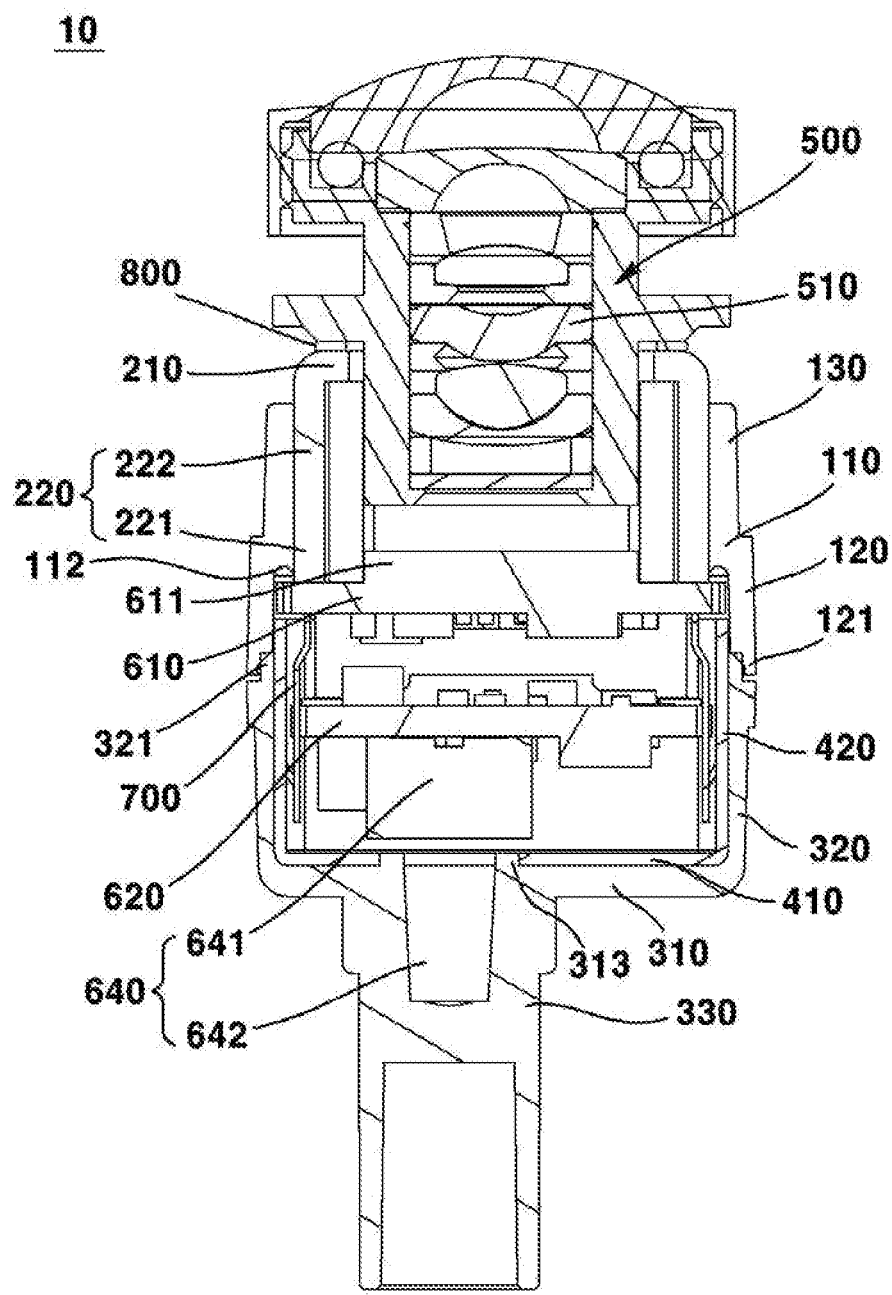
FIG. 5 is a cross-sectional view taken along line B-B of FIG. 3.
Figure 6:
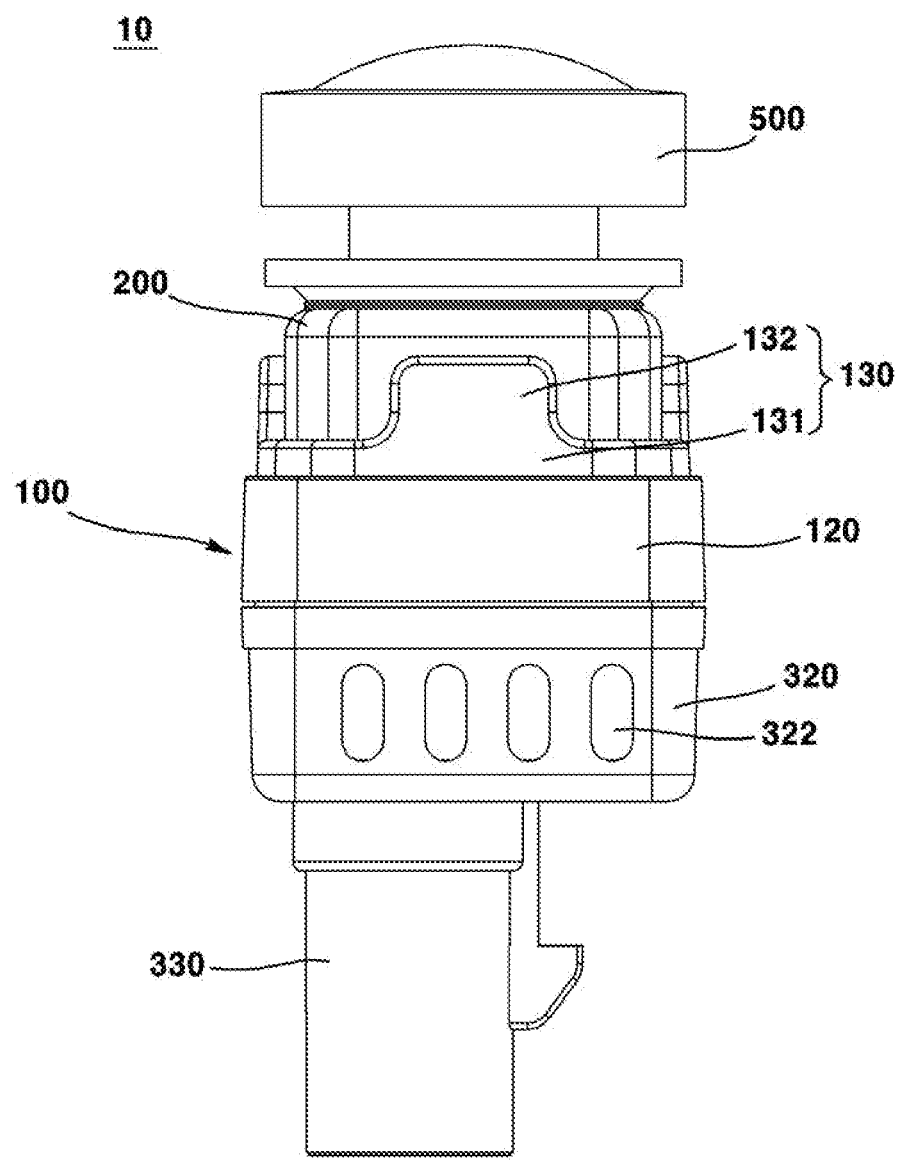
FIG. 6 is a side view of a camera module according to the present embodiment.
Figure 7:
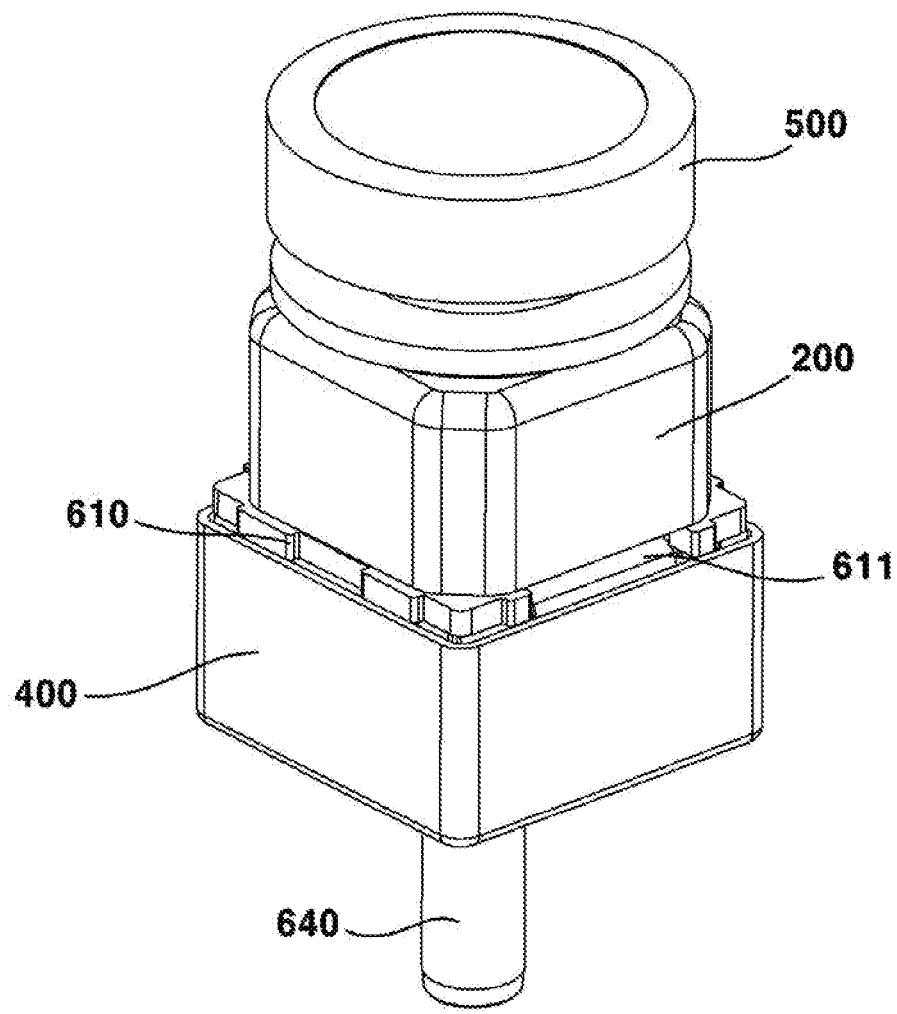
FIG. 7 is a perspective view in which a first body and a second body of the camera module according to the present embodiment are removed.
Figure 8:
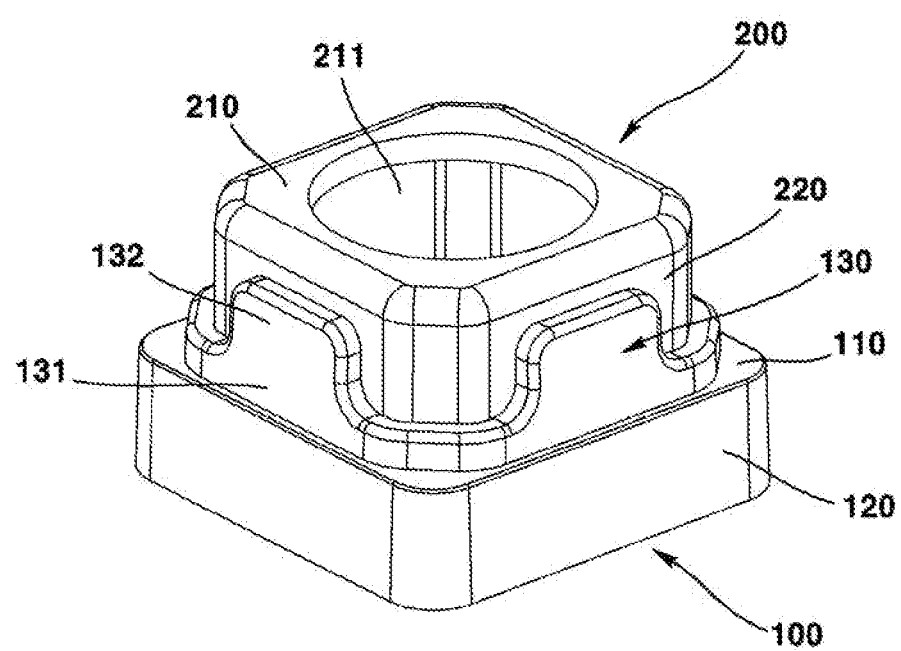
FIG. 8 is a perspective view of a first body and a first shield cover of a camera module according to the present embodiment viewed from above.
Figure 9:
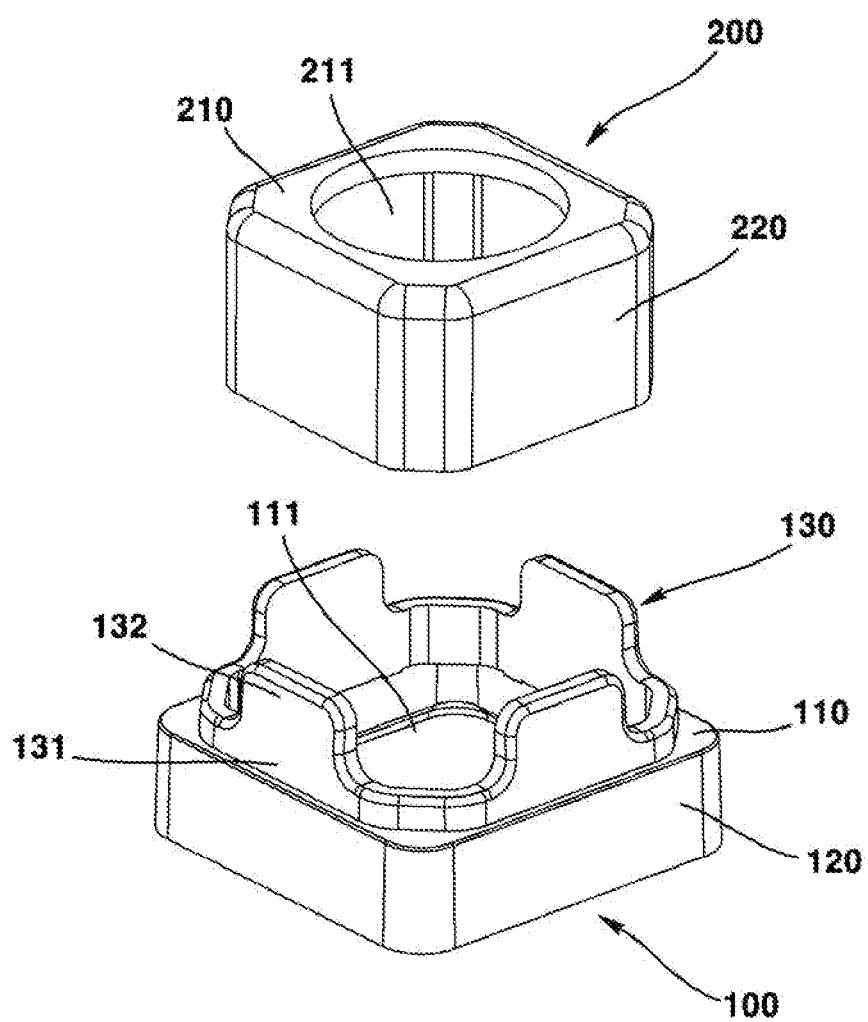
FIG. 9 is an exploded perspective view of FIG. 8.
Figure 10:
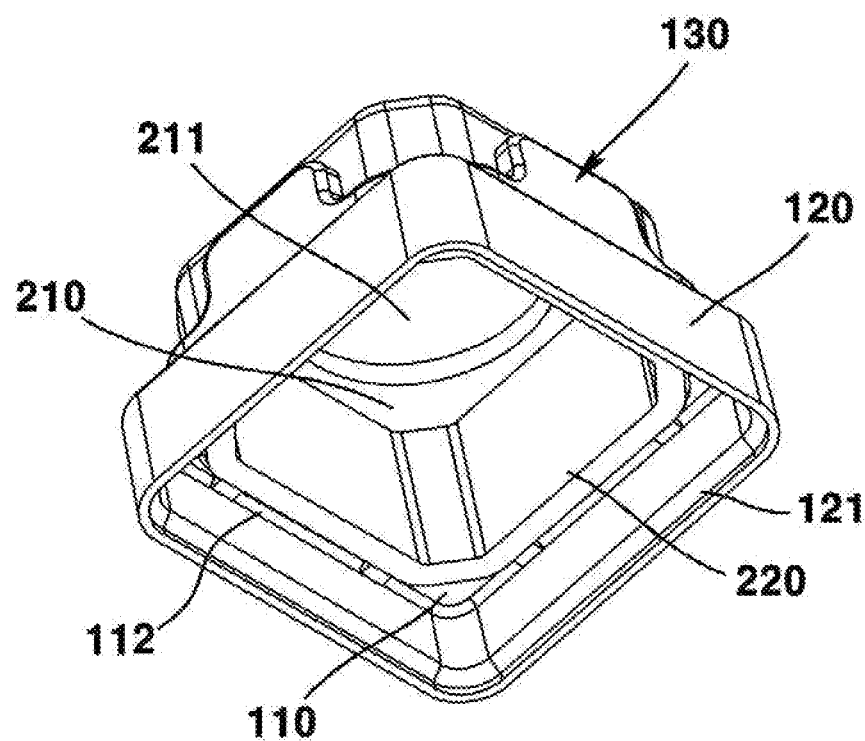
FIG. 10 is a perspective view of a first body and a first shield cover of a camera module according to the present embodiment viewed from below.
Figure 11:
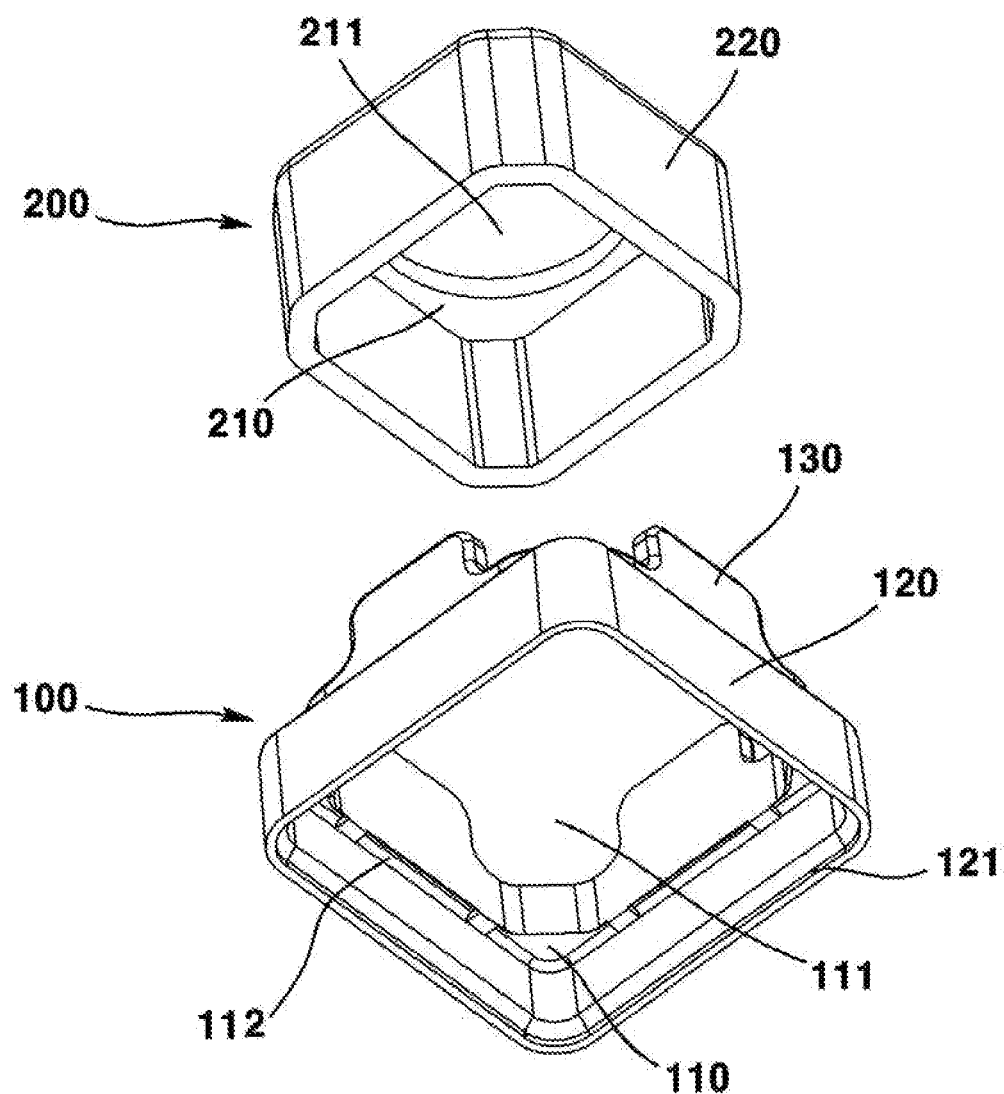
FIG. 11 is an exploded perspective view of FIG. 10.
Figure 12:
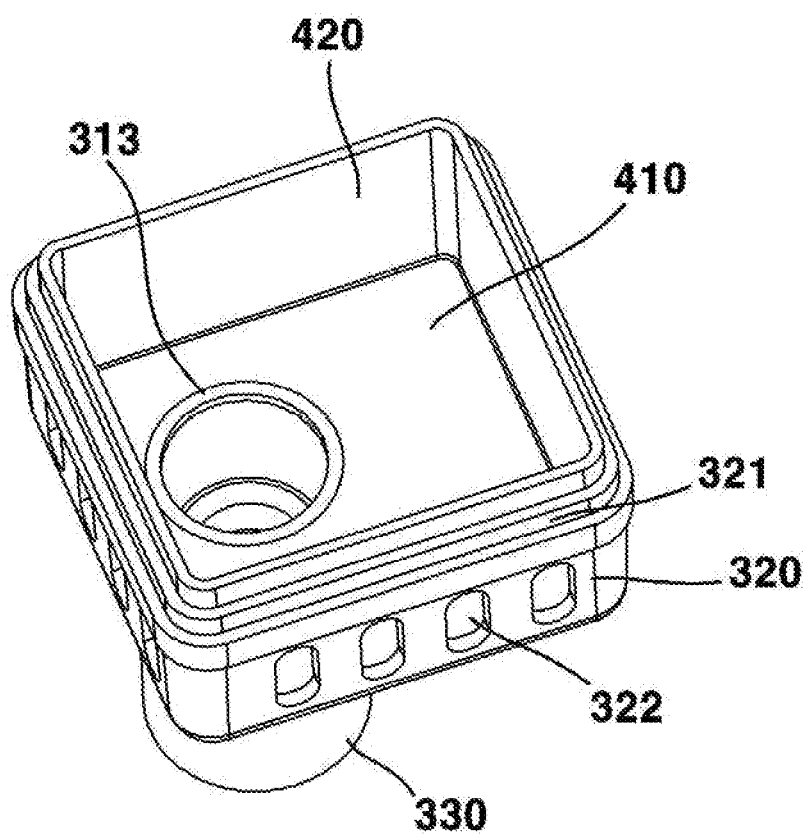
FIG. 12 is a perspective view from above of a second body and a second shield cover of a camera module according to the present embodiment.
Figure 13:
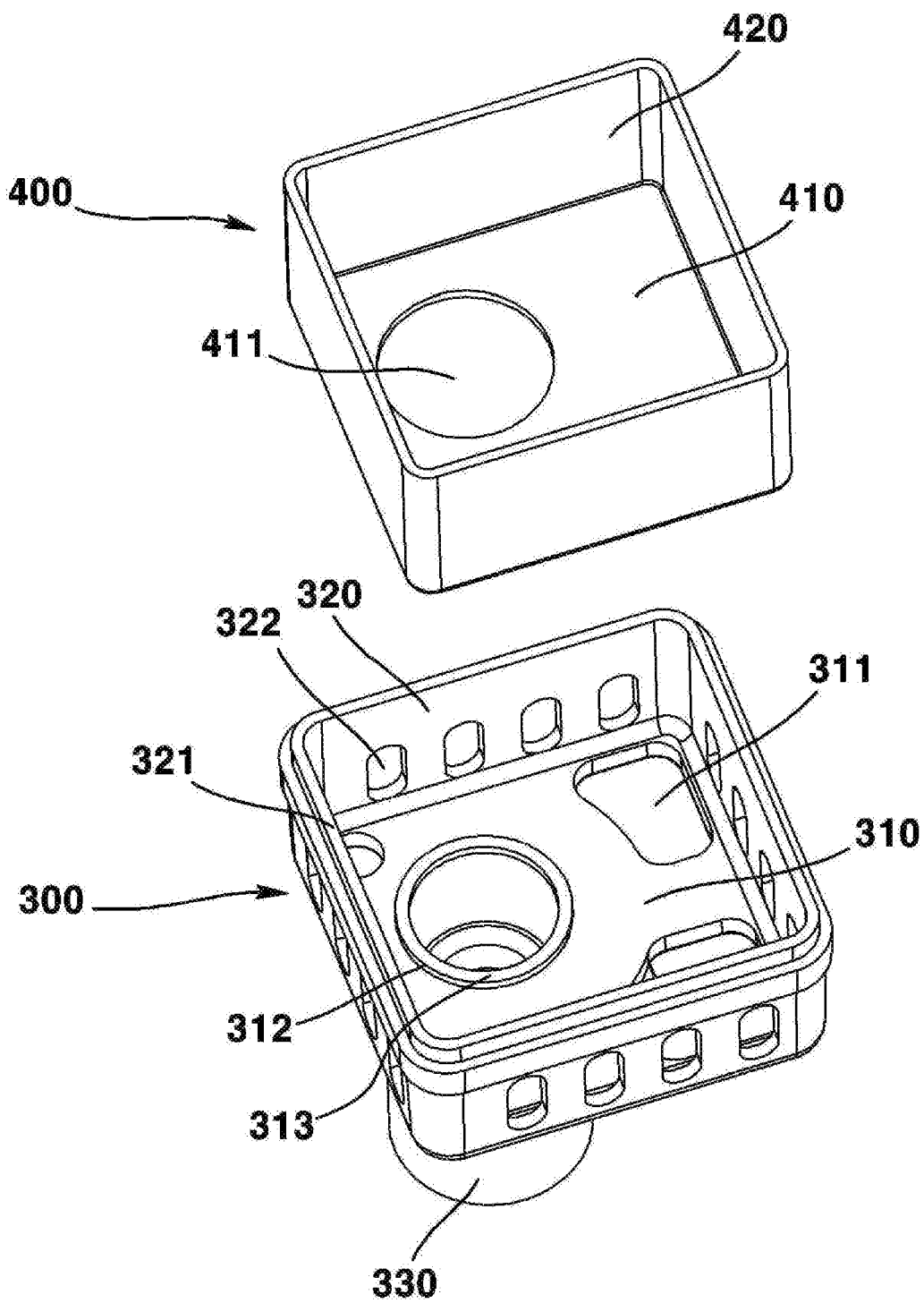
FIG. 13 is an exploded perspective view of FIG. 12.
Figure 14:
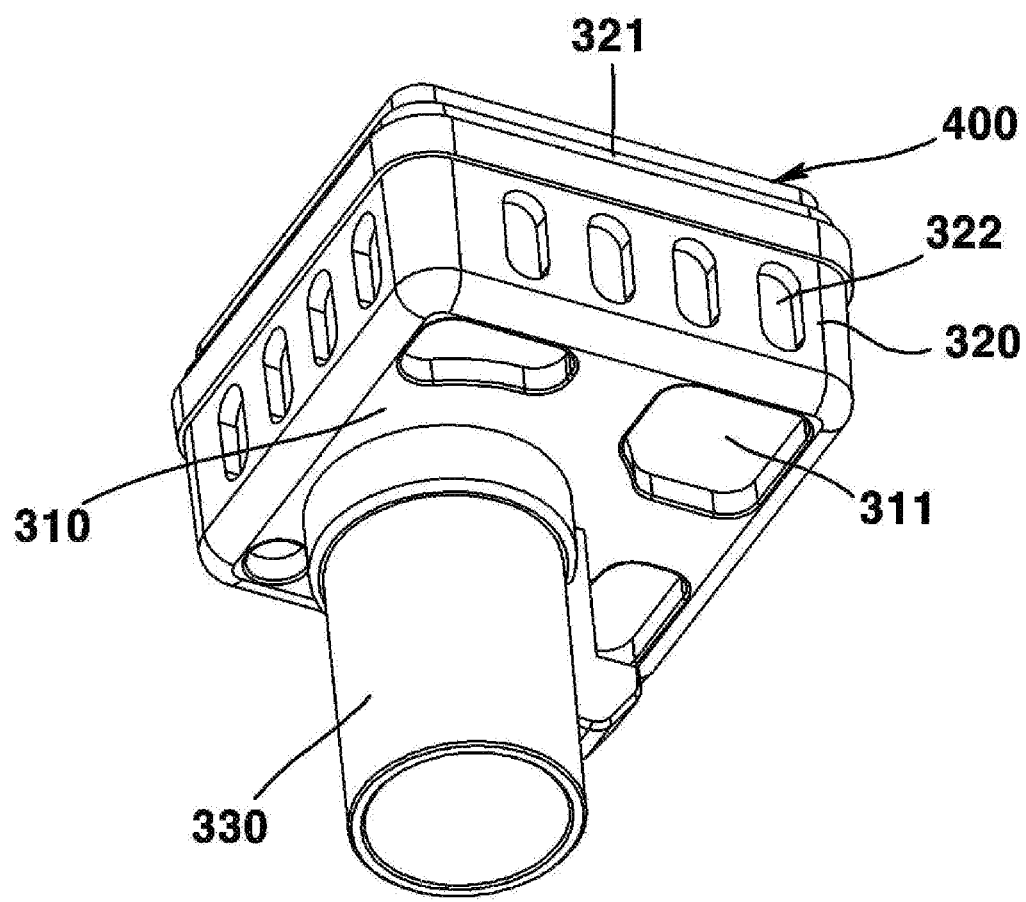
FIG. 14 is a perspective view of a second body and a second shield cover of a camera module according to the present embodiment as viewed from below.
Figure 15:
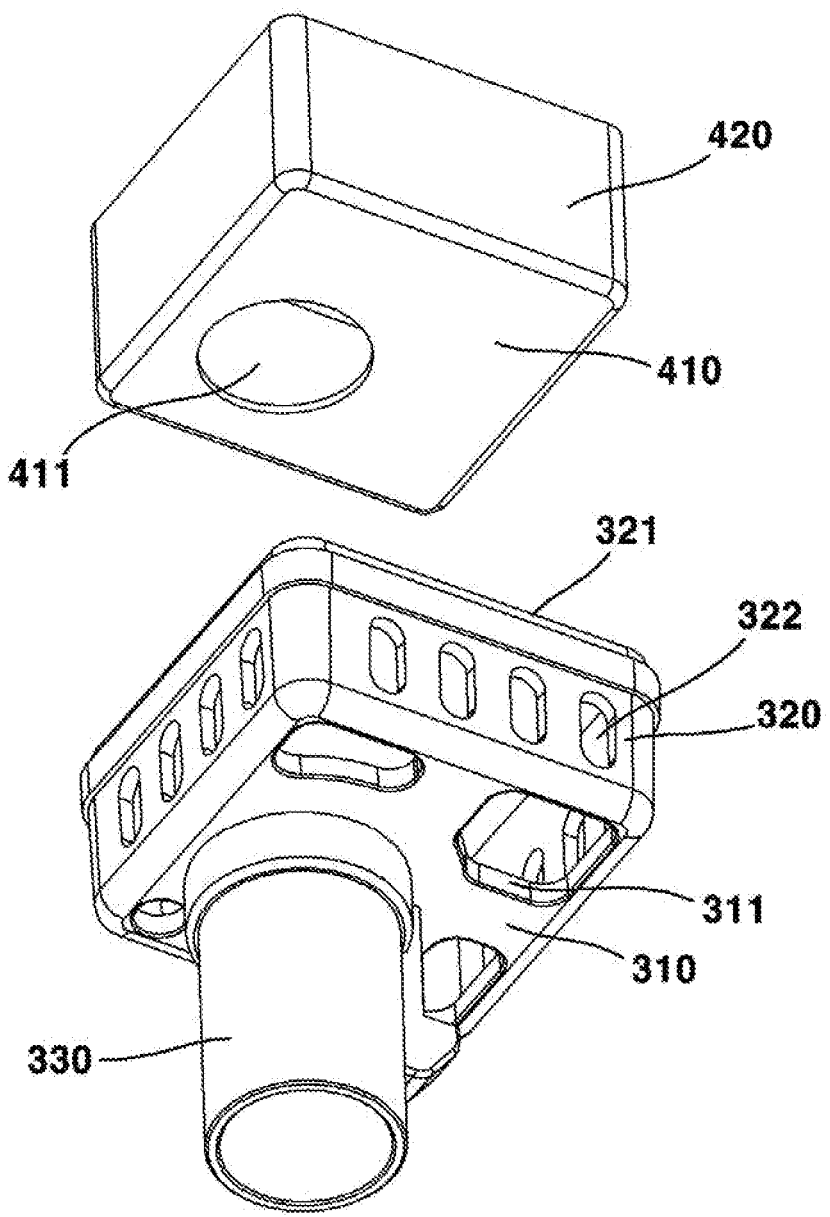
FIG. 15 is an exploded perspective view of FIG. 14.
Figure 16:
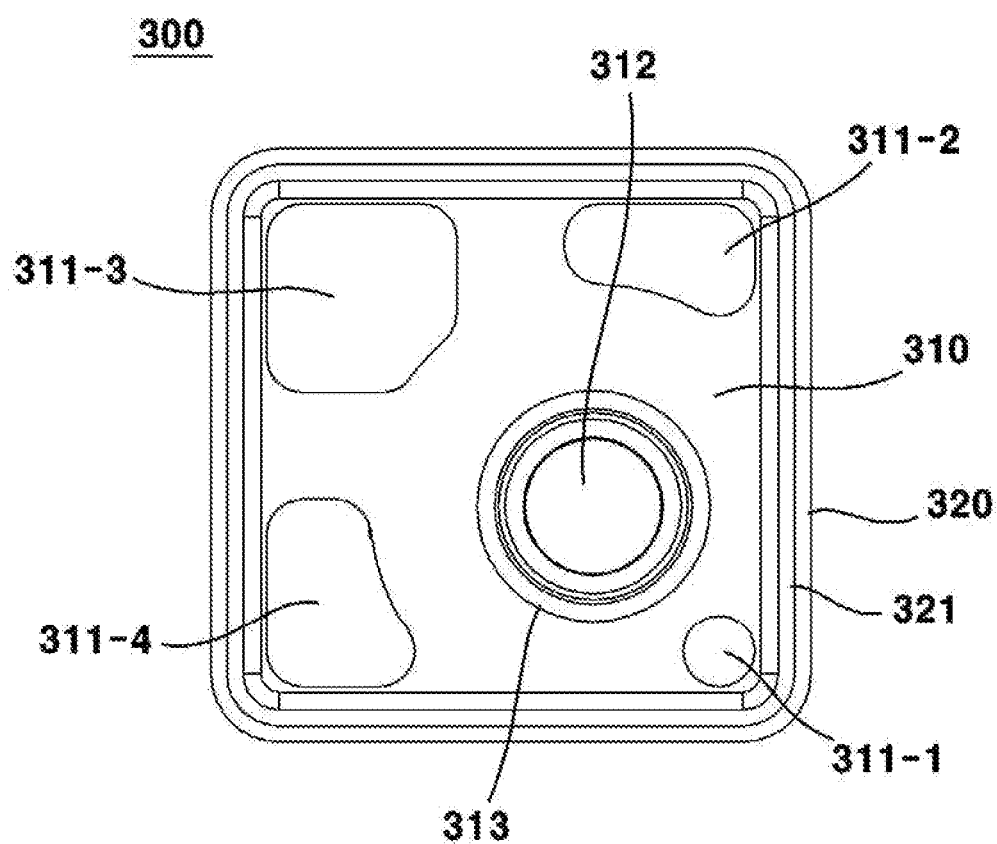
FIG. 16 is a front view of a second body of a camera module according to the present embodiment.
Figure 17:
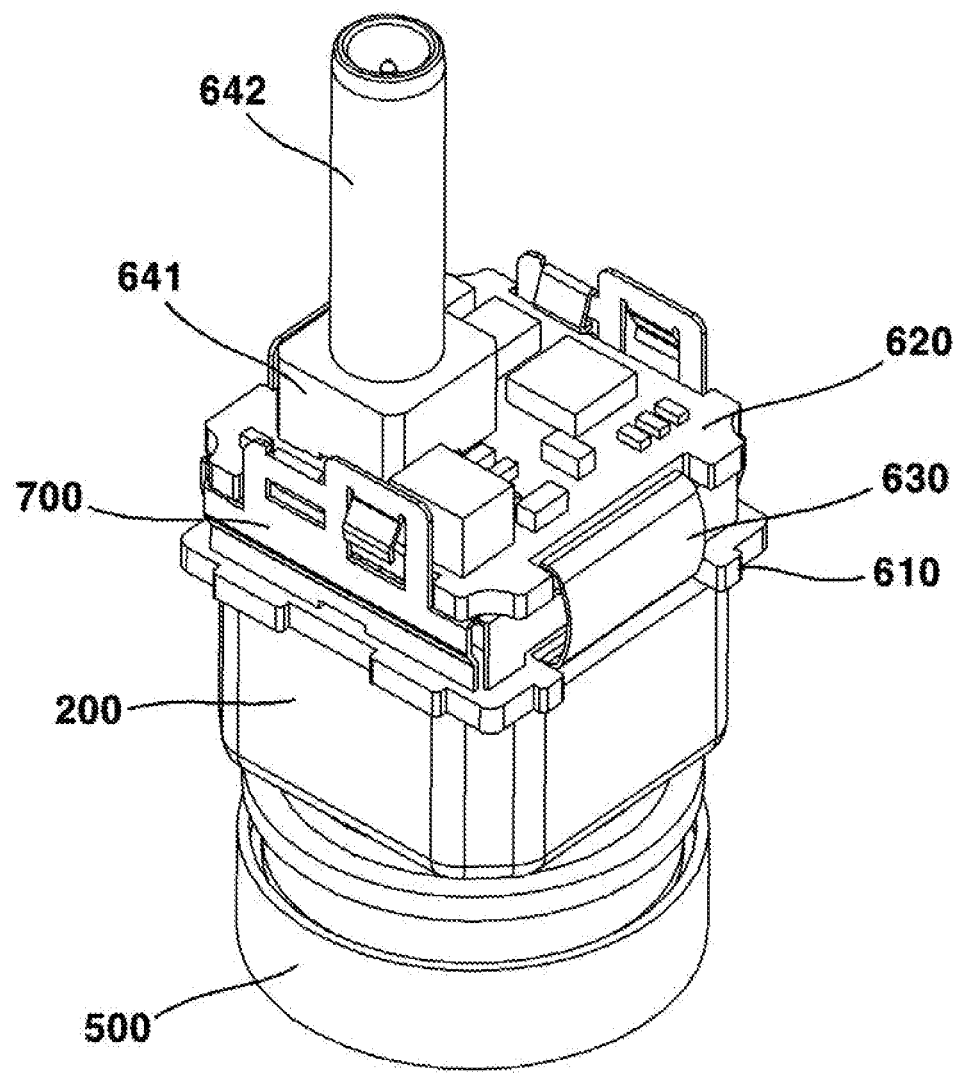
FIG. 17 is a perspective view illustrating a coupling relationship between a first shield cover and a substrate assembly of a camera module according to the present embodiment.
Figure 18:
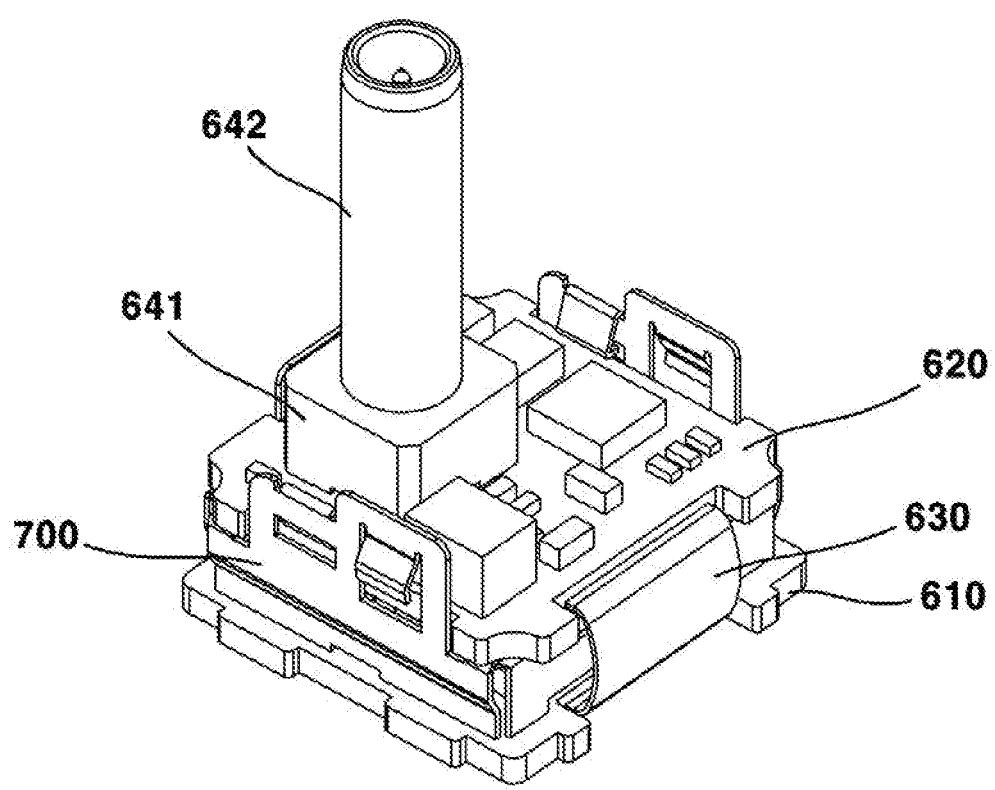
FIGS. 18 and 19 are perspective views of a substrate assembly of a camera module according to the present embodiment.
Figure 19:
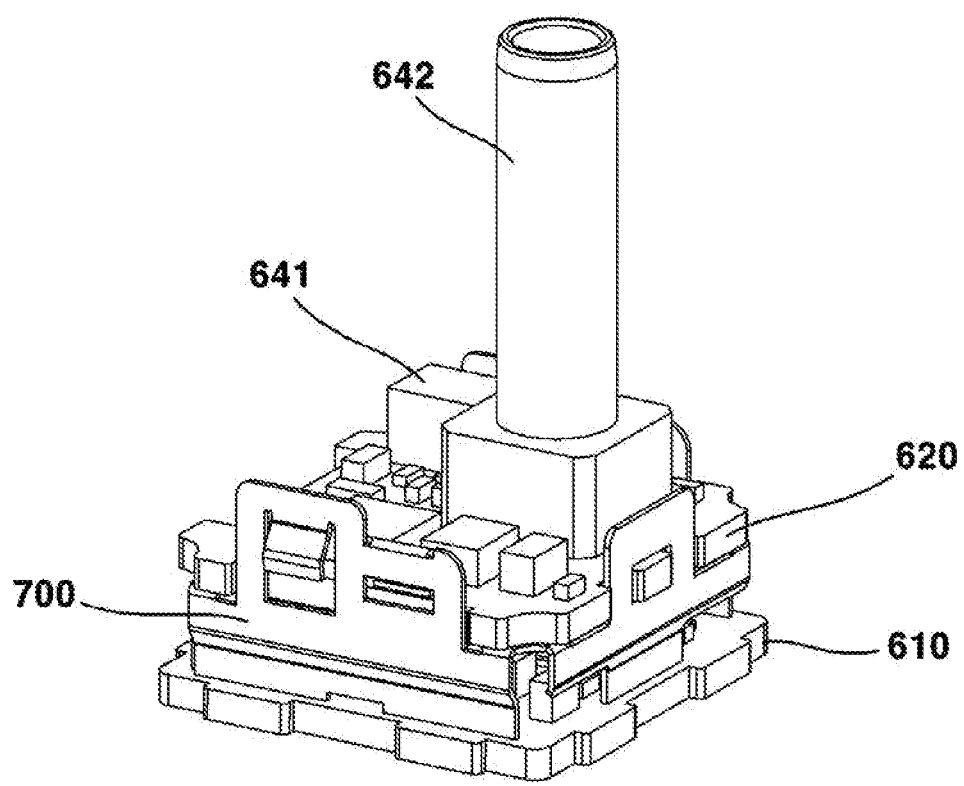
Figure 20:
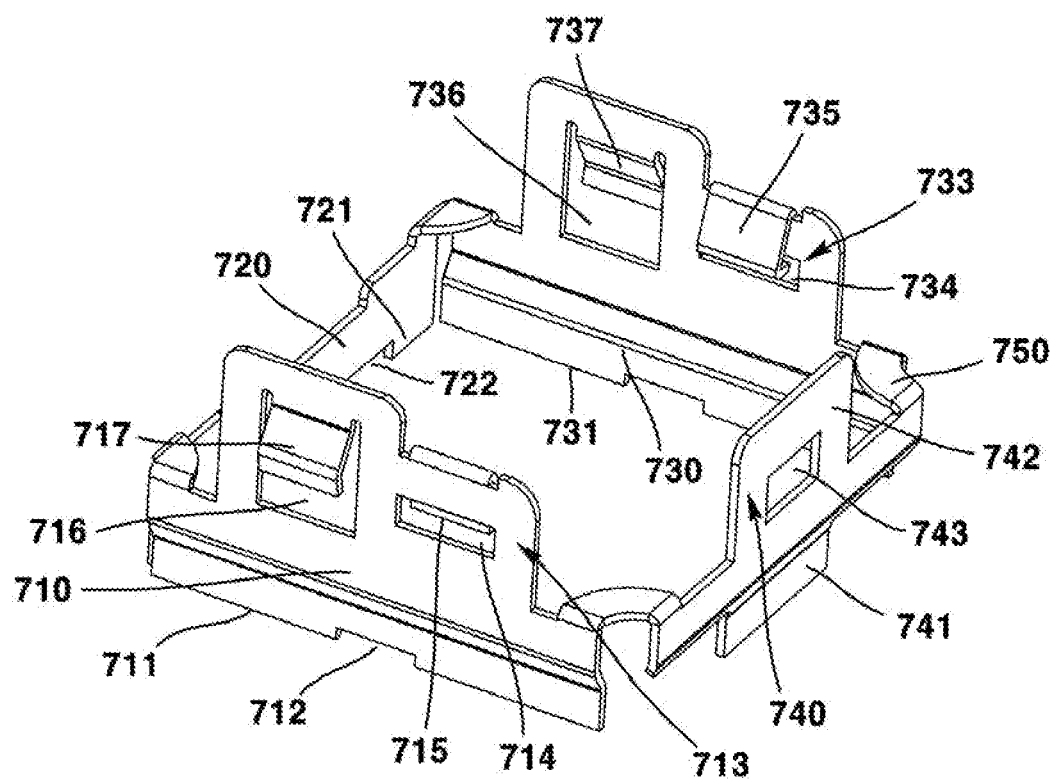
FIG. 20 is a perspective view of a shield member of a camera module according to the present embodiment.
Figure 21:
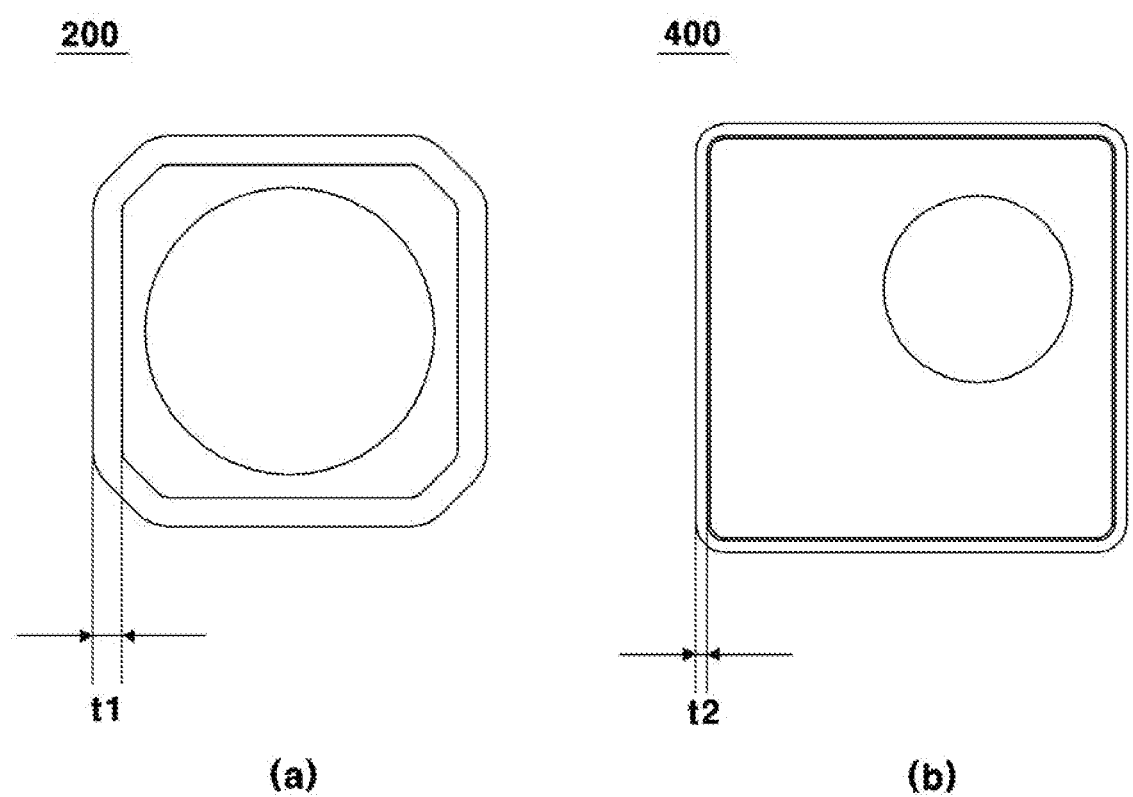
FIG. 21 (a) is a rear view of a first shield cover of a camera module according to the present embodiment, and FIG. 21 (b) is a plan view of a second shield cover of a camera module according to the present embodiment.
Figure 22:
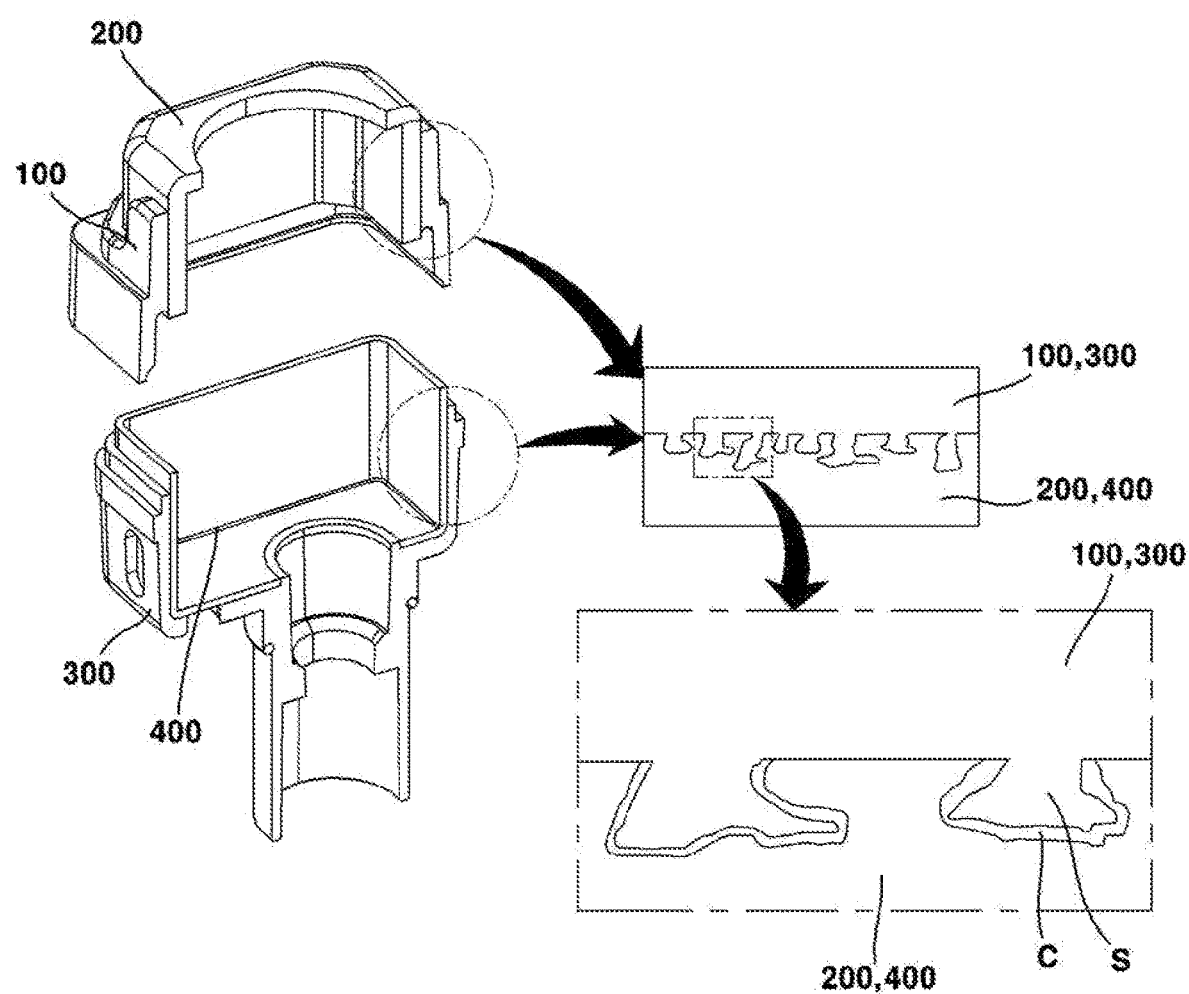
FIG. 22 is a view illustrating a coupling surface between a first shield cover and a first body and a coupling surface between a second shield cover and a second body of a camera module according to the present embodiment.

FIG. 1 is a perspective view of a camera module according to the present embodiment; FIG. 2 is an exploded perspective view of a camera module according to the present embodiment; FIG. 3 is a plan view of a camera module according to the present embodiment; FIG. 4 is a cross-sectional view taken along line A-A of FIG. 3; FIG. 5 is a cross-sectional view taken along line B-B of FIG. 3; FIG. 6 is a side view of a camera module according to the present embodiment; FIG. 7 is a perspective view in which a first body and a second body of the camera module according to the present embodiment are removed; FIG. 8 is a perspective view of a first body and a first shield cover of a camera module according to the present embodiment viewed from above; FIG. 9 is an exploded perspective view of FIG. 8; FIG. 10 is a perspective view of a first body and a first shield cover of a camera module according to the present embodiment viewed from below; FIG. 11 is an exploded perspective view of FIG. 10; FIG. 12 is a perspective view from above of a second body and a second shield cover of a camera module according to the present embodiment; FIG. 13 is an exploded perspective view of FIG. 12; FIG. 14 is a perspective view of a second body and a second shield cover of a camera module according to the present embodiment as viewed from below; FIG. 15 is an exploded perspective view of FIG. 14; FIG. 16 is a front view of a second body of a camera module according to the present embodiment; FIG. 17 is a perspective view illustrating a coupling relationship between a first shield cover and a substrate assembly of a camera module according to the present embodiment; FIGS. 18 and 19 are perspective views of a substrate assembly of a camera module according to the present embodiment; FIG. 20 is a perspective view of a shield member of a camera module according to the present embodiment; FIG. 21 (*a*) is a rear view of a first shield cover of a camera module according to the present embodiment; FIG. 21 (*b*) is a plan view of a second shield cover of a camera module according to the present embodiment; and FIG. 22 is a view illustrating a coupling surface between a first shield cover and a first body and a coupling surface between a second shield cover and a second body of a camera module according to the present embodiment.

The camera module 10 according to an embodiment of the present invention may be a vehicle camera module. The camera module 10 may be coupled to a vehicle. The camera module 10 may be used in any one or more among a front camera, a side camera, a rear camera, and a black box of a vehicle. The camera module 10 may be disposed in front of a vehicle. The camera module 10 may be disposed at a rear of a vehicle. The camera module 10 may be coupled to a windshield of a vehicle. The camera module 10 may be coupled to a windshield at a front or rear of a vehicle. The camera module 10 may be disposed at a side of a vehicle. The camera module 10 may photograph a subject and output it as an image on a display (not shown).

The camera module 10 may include a first body 100. The first body 100 may be referred to as any one of a front body, an upper housing, and a first housing. The first body 100 may be formed of a plastic material. The first body 100 may be formed in a rectangular shape with an open lower portion. The first body 100 may be disposed on the second body 300. The first body 100 may be coupled to the second body 300. A lower end of the first body 100 may be fixed to the second body 300. The first body 100 may be coupled to the second body 300 by any one among ultrasonic welding, laser welding, and thermal welding. In a modified embodiment, the first body 100 may be coupled to the second body 300 by an adhesive.

A first shield cover 200 may be disposed inside the first body 100. A lower end of the side plate 220 of the first shield cover 200 may be disposed inside the first body 100. The first body 100 may be coupled to the first shield cover 200. The first body 100 may be insert-injected with the first shield cover 200.

The first body 100 may include an upper plate 110 and a side plate 120 being extended from the upper plate 110. The upper plate 110 may be formed in a rectangular plate shape. The upper plate 110 may be extended outwardly from an outer circumferential surface of the coupling part 130. The upper plate 110 may be parallel to the upper plate 210 of the first shield cover 200. The upper plate 110 may not be overlapped with the upper plate 210 of the first shield cover 200 in an optical axis direction.

The upper plate 110 may include a hole 111. The first shield cover 200 may be disposed in the hole 111. At least a portion of the first shield cover 200 may be disposed in the hole 111. The side plate 220 of the first shield cover 200 may be coupled to the hole 111. At least a portion of the side plate 220 of the first shield cover 200 may be disposed in the hole 111. The first portion 221 of the side plate 220 of the first shield cover 200 may be disposed in the hole 111. The upper plate 110 may be insert-injected with the first portion 221 of the side plate 220 of the first shield cover 200.

The upper plate 110 may include a groove 112. The groove 112 may be recessed upward from a lower surface of the upper plate 110. The groove 112 may be formed at an outer side of a lower end of the side plate 220 of the first shield cover 200. The groove 112 may be overlapped with at least a portion of the first portion 221 of the side plate 220 of the first shield cover 220 in a direction perpendicular to the optical axis direction. The groove 112 may be overlapped with at least a portion of the first substrate 610 in an optical axis direction. The groove 112 may be overlapped with the coupling part 130 in an optical axis direction. The groove 112 may not be overlapped with the side plate 120 of the first body 100 in an optical axis direction. The groove 112 may be formed at a position corresponding to an outer edge area of the first substrate 610. An adhesive may be disposed in the groove 112. An epoxy may be disposed in the groove 112. An epoxy-based adhesive may be disposed in the groove 112. In this case, the adhesive may be attached to the upper plate 110 of the first body 100 of the first substrate 610. The adhesive may be fixed to the upper plate 110 of the first body 100 of the first substrate 610.

The side plate 120 may be extended downward from an outer edge of the upper plate 110. The side plate 120 may be extended downward from an edge of the upper plate 110. The side plate 120 may include a plurality of side plates 120. The side plate 120 may be disposed outside the coupling part 130. The side plate 120 may not be overlapped with the coupling part 130 in a direction perpendicular to the optical axis direction. The side plate 120 may be parallel to the coupling part 130. The plurality of side plates 120 may include a first side plate, a second side plate, a third side plate being disposed at an opposite side of the first side plate, and a fourth side plate being disposed at an opposite side of the second side plate.

The side plate 120 may include a groove 121. The groove 121 may be recessed from a lower end of the side plate 120. The groove 121 may be recessed from a partial area of a lower end of the side plate 120. The side plate 320 of the second body 300 may be disposed in the groove 121. The protruded portion 321 of the side plate 320 of the second body 300 may be disposed in the groove 121. The groove 121 and the protruded portion 321 of the side plate 320 may be a portion to which any one among ultrasonic welding, laser welding, and thermal welding is irradiated. The groove 121 and the protruded portion 321 of the side plate 320 may be fixed by any one among ultrasonic welding, laser welding, and thermal welding.

The first body 100 may include a coupling part 130. The coupling part 130 may be protruded upward from the upper plate 110 of the first body 100. The coupling part 130 may be extended upward from an edge area of the hole 111 of the upper plate 110. The coupling part 130 may be extended upward from an inner surface of the hole 111 of the upper plate 110.

The first shield cover 200 may be disposed inside the coupling part 130. The side plate 220 of the first shield cover 200 may be disposed inside the coupling part 130. The coupling part 130 may be coupled to the side plate 220 of the first shield cover 200. The inner surface of the coupling part 130 may be in contact with the outer surface of the side plate 220 of the first shield cover 200. The coupling part 130 may be insert-injected into the side plate 220 of the first shield cover 200. The coupling part 130 may surround a portion of the first shield cover 200 being exposed to the outside to prevent damage applied to the first shield cover 200 from an external impact.

The coupling part 130 may include a first area 131 having a first width, and a second area 132 being extended upward from the first area 131 and having a second width greater than the first width. At this time, the width may mean a length in a direction perpendicular to the optical axis direction. The length of the coupling part 130 in an optical axis direction of the first area 131 may be smaller than the length of the second area 132 of the coupling part 130 in an optical axis direction. The first area 131 may be disposed closer to the upper plate 110 of the first body 100 than the second area 132. The first area 131 may be protruded upward from an inner surface of the hole 111 of the upper plate 110 of the first body 100.

The coupling part 130 may include a plurality of coupling parts 130. A plurality of coupling parts 130 may include: a first coupling part; a second coupling part; a third coupling part being disposed at an opposite side of the first coupling part; and a fourth coupling part disposed at an opposite side of second coupling part. The first coupling part may be formed at a position corresponding to a first side plate of the first body 100. The second coupling part may be formed at a position where the first body 100 corresponds to the second side plate. The third coupling part may be formed at a position corresponding to the third side plate of the first body 100. The fourth coupling part may be formed at a position corresponding to the fourth side plate of the first body 100. The first to fourth coupling parts may be integrally formed.

The plurality of coupling parts 130 may include a first area 131 having a first width and a second area 132 having a second width, respectively. The first coupling part may include a first-first area having a first width and a second-first area having a second width. The second coupling part may include a first-second area having a first width and a second-second area having a second width. The third coupling part may include a first-third area having a first width and a second-third area having a second width. The fourth coupling part may include a first-fourth area having a first width and a second-fourth area having a second width.

The first-first area to the first-fourth area may be integrally formed. The first-first area to the first-fourth area may be connected to each other. The second-first area to the second-fourth area may be respectively disposed in the first to fourth side plates of the first shield cover 200. The second-first area to the second-fourth area may be spaced apart from each other. A groove may be formed between the second-first area and the second-fourth area. At this time, a groove formed between the second-first area and the second-fourth area may be disposed at four corners of the first shield cover 200.

The camera module 10 may include a first shield cover 200. The first shield cover 200 may be formed of a metal material. The first shield cover 200 may be formed of an aluminum material. The first shield cover 200 may be formed in a rectangular shape with an open lower portion of the first shield cover 200. The first shield cover 200 may be disposed inside the first body 100. At least a portion of the first shield cover 200 may be disposed inside the first body 100. The first shield cover 200 may be coupled to the first body 100. The first shield cover 200 may be insert-injected with the first body 100. The first shield cover 200 may be coupled to the lens module 500. The lens module 500 may be disposed inside the first shield cover 200. At least a portion of the first shield cover 200 may be disposed at a higher position than the upper plate 110 of the first body 100 to be exposed to the outside.

The first shield cover 200 may be coupled to the first body 100 in a way that waterproofing is possible. Depending on the use, waterproofing may satisfy IP52 or higher for waterproof and dustproof, and if it is installed outside of a vehicle, it may satisfy IP69K.

The first shield cover 200 may include an upper plate 210 and a side plate 220 being extended from the upper plate 210. The upper plate 210 may include a rectangular plate shape. The upper plate 210 may be parallel to the upper plate 100 of the first body 100. The cross-sectional area of the upper plate 210 may be smaller than the cross-sectional area of the upper plate 110 of the first body 100. The upper plate 210 may be disposed at a higher position than the upper plate 110 of the first body 100. The upper plate 210 may be exposed to the outside. The upper plate 210 may not be overlapped with the first body 100 in an optical axis direction. The upper plate 210 may not be overlapped with the upper plate 110 of the first body 100 in an optical axis direction. The first shield cover 200 may be coupled to the substrate assembly 600.

The upper plate 210 may include a hole 211. The lens module 500 may be disposed in the hole 211. At least a portion of the lens module 500 may penetrate through the hole 211. The hole 211 may be formed at a position corresponding to the image sensor 611 of the first substrate 610 in an optical axis direction. The diameter of the hole 211 in a direction perpendicular to the optical axis direction may be smaller than the diameter in a direction perpendicular to the optical axis direction of the hole 111 of the upper plate 110 of the first body 100.

The side plate 220 may be extended downward from an outer edge of the upper plate 210. The side plate 220 may be extended downward from an edge of the upper plate 210. The side plate 220 may be disposed more inner side than the coupling part 130. The side plate 220 may be parallel to the coupling part 130. The side plate 220 may include a plurality of side plates 220. The plurality of side plates 220 may include: a first side plate; a second side plate; a third side plate being disposed at an opposite side of the first side plate; and a fourth side plate being disposed at an opposite side of the second side plate. A first coupling part may be disposed in the first side plate of the first shield cover 200. A second coupling part may be disposed in the second side plate of the first shield cover 200. A third coupling part may be disposed in the third side plate of the first shield cover 200. A fourth coupling part may be disposed in the fourth side plate of the first shield cover 200. The first shield cover 200 may include a corner being disposed between the plurality of side plates 220. A corner may include a plurality of corners. The plurality of corners may include four corners. The four corners include a first corner being disposed between the first side plate and the second side plate, a second corner being disposed between the second side plate and the third side plate, a third corner being disposed between the third side plate and the fourth side plate, and a fourth corner being disposed between the fourth side plate and the first side plate. A groove being formed between the plurality of second areas 132 of the coupling part 130 may be disposed in each of the plurality of corners. A first substrate 610 may be disposed at a lower end of the side plate 220.

The side plate 220 may include a first portion 221. The first portion 221 may be coupled to an upper plate 110 of the first body 100. The first portion 221 may refer to a portion for insert injection with the upper plate 110 of the first body 100. The first portion 221 may be disposed in the hole 111 of the upper plate 110 of the first body 100. The first portion 221 may be in contact with an inner circumferential surface of the hole 111 of the upper plate 110 of the first body 100. The first portion 221 may be fixed to the upper plate 110 of the first body 100 by insert injection. The first portion 221 may not be overlapped with the coupling part 130 of the first body 100 in a direction perpendicular to the optical axis direction. The first portion 221 may be disposed at a lower position than the coupling part 130 of the first body 100. The lower end of the first portion 221 may be coupled to a first surface of the first substrate 610. The first portion 221 may be overlapped with the image sensor 611 in a direction perpendicular to the optical axis direction. The length of the first portion 221 in an optical axis direction may be shorter than the length of the second portion 222 in an optical axis direction. Through this, the area in which the first shield cover 200 is exposed to the outside can be maximized. Through this, the heat dissipation performance of the camera module 10 can be maximized.

The side plate 220 may include a second portion 222. The second portion 222 may be extended upwardly from the first portion 221. The second portion 222 may be connected to the upper plate 210. A coupling part 130 may be disposed in the second portion 222. The second portion 222 may refer to a portion for insert injection with the coupling part 130. The second portion 222 may be in contact with an inner surface of the coupling part 130. The second portion 222 may be fixed to the coupling part 130 by insert injection. The second portion 222 may be overlapped with the coupling part 130 in a direction perpendicular to the optical axis direction. The second portion 222 may not be overlapped with the upper plate 110 of the first body 100 in a direction perpendicular to the optical axis direction. The length of the second portion 222 in an optical axis direction may be longer than the length of the first portion 221 in an optical axis direction. Through this, the area in which the first shield cover 200 is exposed to the outside can be maximized. Through this, the heat dissipation performance of the camera module 10 can be maximized.

The first shield cover 200 may be integrally formed through molding of a metal. The upper plate 210, the side plate 220 and the corners of the first shield cover 200 may be integrally formed through molding of a metal. In more detail, the first shield cover 200 may be seated on a solid mold having a rectangular shape. At this time, the first shield cover 200 may be pressed in a direction toward the mold to form a first shield cover. In this case, it is possible to solve the problem of forming a gap between the side plates being generated in a cover being formed by a method in which the plate material is being bent to form side plates followed by coupling of the formed side plates. That is, in the first shield cover 200 of the present embodiment, since the side plate 220 and the corner are integrally formed, the space between the plurality of side plates 220 or the side plate 220 and the corner may not be spaced apart.

The first shield cover 200 may be treated with a metal surface. The first shield cover 200 may be pre-processed. The surface of the first shield cover 200 to be bonded with the first body 100 may be treated with a metal surface. The bonding surface of the first body 100 of the side plate 220 of the first shield cover 200 may be treated with a metal surface. The first portion 221 of the side plate 220 of the first shield cover 200 may be subjected to metal surface treatment before insert injection with the upper plate 110 of the first body 100. The contact surface with the coupling part 130 of the first body 100 among the second portions 222 of the side plate 220 of the first shield cover 200 may be treated with a metal surface.

The shield cover 200 may undergo a pretreatment process of the metal surface before insert injection into the first body 100. The first shield cover 200 may be formed of aluminum. At least a portion of the first shield cover 200 may be formed of aluminum. The first shield cover 200 may be formed of a metal material having high thermal conductivity. The pretreatment or metal surface treatment may refer to a process of removing oil attached to the metal surface and forming a film layer or a coating layer C. When the bonding surface of the first shield cover 200 with the first body 100 is immersed in a special solution for a certain period of time, nano-sized pores S on the bonding surface of the first shield cover 200 with the first body 100 can be formed. Through this, a portion of the first body 100 made of plastic is melted by the heat generated during the insert injection process of the first shield cover 200 and the first body 100 and may be flow into the pores S of the first shield cover 200. In this case, bonding force, coupling force, and adhesive force between the first shield cover 200 and the first body 100 may be increased. In addition, if the bonding surface of the first shield cover 200 with the first body 100 is immersed in a special solution for a certain period of time, a coating layer C or a film layer may be formed on the bonding surface of the first shield cover 200 with the first body 100. Through this, it is possible to prevent interfacial separation between the bonding surface of the first shield cover 200 and the first body 100. In addition, waterproofing between the first shield cover 200 and the first body 100 may be possible without a separate waterproof member or a sealing member.

The first shield cover 200 may be fixed to the first body 100 through insert injection. The first shield cover 200 may be fixed to the first body 100 through insert molding. Insert injection or insert molding may refer to a molding method in which a metal member and a plastic member are integrated. A portion of the first body 100 may be melted by heat generated during the insert injection process and introduced into the pores S generated during the pretreatment of the first shield cover 200.

Referring to FIG. 21, the thickness t1 of the side plate 220 of the first shield cover 200 in a direction perpendicular to the optical axis direction may be thicker than the thickness t2 of the side plate 420 of the second shield cover 400 in a direction perpendicular to the optical axis direction. Since the area where the first shield cover 200 is exposed to the outside is larger than the area where the second shield cover 400 is exposed to the outside, this may be to minimize damage applied to the first shield cover 200 from an external impact such as vibration of a vehicle.

The camera module 10 may include a second body 300. The second body 300 may be referred to as any one among a rear body, a lower housing, and a second housing. The second body 300 may be formed in a rectangular shape with an open upper portion. The second body 300 may be formed of a plastic material. The second body 300 may be disposed below the first body 100. The second body 300 may be coupled to the first body 100. The second body 300 may be fusion-bonded to the first body 100. The second body 300 may be coupled to the first body 100 by any one among ultrasonic welding, laser welding, and thermal welding. At this time, ultrasonic welding may mean a process in which the first body 100 is vibrated with pressure while the second body 300 is fixed so that the fusion part of the second body 300 and the first body 100 is fused and integrated. The second body 300 may form an internal space through coupling with the first body 100.

The second body 300 may include a bottom plate 310. The bottom plate 310 may face the upper plate 110 of the first body 100. The bottom plate 310 may be spaced apart from the upper plate 110 of the first body 100 in an optical axis direction. The bottom plate 310 may be parallel to the upper plate 110 of the first body 100. The bottom plate 310 may be formed in a rectangular shape.

The bottom plate 310 may include a first hole 311. The first hole 311 may be formed by penetrating the upper and lower surfaces of the bottom plate 310. The first hole 311 may expose the second shield cover 400 to the outside. Through this, heat generated in the internal space of the first body 100 and the second body 300 may be radiated to the outside. Through this, the heat dissipation function of the camera module 10 may be performed.

The first hole 311 may include a plurality of first holes 311. The plurality of first holes 311 may have different shapes. Cross-sectional areas of the plurality of first holes 311 may be different from one another. The plurality of first holes 311 may include four first holes 311 being spaced apart from one another. The first hole 311 may include a first-first hole 311-1, a first-second hole 311-2, a first-third hole 311-3, and a first-fourth hole 311-4 being spaced apart in the circumferential direction about the second hole 312. The first-first hole 311-1, the first-second hole 311-2, the first-third hole 311-3, and the first-fourth hole 311-4 may have different shapes, respectively. The cross section of the first-first hole 311-1 may be formed in a curved shape at least in part. The cross-sectional area of the first-first hole 311-1 may be smaller than the cross-sectional area of the first-second to first-fourth holes 311-2, 311-3, and 311-4. The cross section of the first-second hole 311-2 may be formed in a curved shape at least in part. The cross-sectional area of the first-second hole 311-2 may be larger than that of the first-first hole 311-1. The cross-sectional area of the first-second hole 311-2 may be smaller than that of the first-fourth hole 311-4. The cross-section of the first-third hole 311-3 may be curved at least in part. The cross-sectional area of the first-third hole 311-3 may be formed larger than the cross-sectional area of the first-first hole 311-1, the cross-sectional area of the first-second hole 311-2, and the cross-sectional area of the first-fourth hole 311-4. The cross section of the first-fourth hole 311-4 may be formed in a curved shape at least in part. The cross-sectional area of the first-fourth hole 311-4 may be larger than that of the first-first hole 311-1. The first-first hole 311-1 and the first-third hole 311-3 may be disposed at an opposite side to each other about the second hole 312. The first-second hole 311-2 and the first-fourth hole 311-4 may be disposed at an opposite side to each other about the second hole 312.

The bottom plate 310 may include a second hole 312. The second hole 312 may be spaced apart from the first hole 311. The second hole 312 may be formed in a circular shape. A connector lead-out part 330 may be disposed in the second hole 312. The connector lead-out part 330 may penetrate through the second hole 312. A connector 640 may pass through the second hole 312. The bottom plate 410 of the second shield cover 400 may be disposed in the bottom plate 310. The bottom plate 410 of the second shield cover 400 may be in contact with the bottom plate 310. The bottom plate 410 of the second shield cover 400 may be coupled to the bottom plate 310 by insert injection.

The bottom plate 310 may include a protruded portion 313. The protruded portion 313 may be protruded upward from the bottom plate 310. The protruded portion 313 may be protruded upward from an upper surface of the bottom plate 310. The protruded portion 313 may be protruded upward from an edge area of the second hole 312 of the bottom plate 310. The protruded portion 313 may be protruded upward from an edge of the second hole 312 of the bottom plate 310. The protruded portion 313 may surround the second hole 312 of the bottom plate 310. The protruded portion 313 may constitute an upper end portion of the connector lead-out portion 330. In this case, the connector lead-out part 300 may be fit-coupled into the second hole 312 of the bottom plate 310 of the second body 300.

The inner diameter of the protruded portion 313 in a direction perpendicular to the optical axis direction may be smaller than the diameter of the second hole 312 of the bottom plate 310 in a direction perpendicular to the optical axis direction. The inner diameter of the protruded portion 313 in a direction perpendicular to the optical axis direction may be smaller than the diameter in a direction perpendicular to the optical axis direction of the hole 411 of the bottom plate 410 of the second shield cover 400. The outer diameter of the protruded portion in a direction perpendicular to the optical axis direction may correspond to the diameter in a direction perpendicular to the optical axis direction of the second hole 312 of the bottom plate 310. At this time, the outer surface of the protruded portion 313 may be in contact with an inner surface of the second hole 312 of the bottom plate 310 of the second body 300. Through this, it is possible to minimize the gap between the second body 300, the connector lead-out part 330, and the second shield cover 400 to prevent moisture from penetrating between the gaps. The outer diameter of the protruded portion in a direction perpendicular to the optical axis direction may correspond to the diameter of the hole 411 of the bottom plate 410 of the second shield cover 400 in a direction perpendicular to the optical axis direction. At this time, the outer diameter of the protruded portion 313 may be in contact with an inner surface of the hole 411 of the bottom plate 410 of the second shield cover 400. Through this, the gap between the second body 300, the connector lead-out 330 and the second shield cover 400 is minimized so that it is possible to prevent moisture from penetrating between the gaps.

The height of the protruded portion 313 in an optical axis direction may correspond to the thickness of the bottom plate 410 of the second shield cover 400 in an optical axis direction. In this case, the upper end of the protruded portion 313 may be disposed on the same plane as the upper surface of the bottom plate 410 of the second shield cover 400. Through this, it is possible to minimize the gap between the second body 300, the connector lead-out part 330, and the second shield cover 400 to prevent moisture from penetrating between the gaps. That is, between the second body 300 and the second shield cover 400 can be waterproofed.

The second body 300 may include a side plate 320. The side plate 320 may be extended from the bottom plate 310. The side plate 320 may be extended from an outer edge of the bottom plate 310. A second shield cover 400 may be disposed in the side plate 320. The second shield cover 400 may be in contact with an inner surface of the side plate 320. The side plate 420 of the second shield cover 400 may be coupled to the side plate 320 by insert injection. The upper end of the side plate 320 may be coupled with the first body 100. The outer surface of the side plate 320 may be disposed on the same plane as the outer side surface of the side plate 120 of the first body 100.

The side plate 320 may include: a first side plate; a second side plate; a third side plate being disposed at an opposite side of the first side plate, and a fourth side plate being disposed at an opposite side of the second side plate. The side plate 320 may include: a first corner being disposed between the first side plate and the second side plate; a second corner being disposed between the second side plate and the third side plate; a third corner being disposed between the third side plate and the fourth side plate; and a fourth corner being disposed between fourth side plate and first side plate. The first to fourth corners of the side plate 320 may include a round shape.

The side plate 320 may include a protruded portion 321. The protruded portion 321 may be protruded upward from an upper end of the side plate 320. The protruded portion 321 may be protruded upward from an upper surface of the side plate 320. The protruded portion 321 may be disposed in the groove 121 of the first body 100. The protruded portion 321 may be fusion-bonded with the groove 121 of the first body 100. At this time, fusion bonding may mean any one among ultrasonic welding, laser welding, and thermal welding. The protruded portion 321 may be protruded from a partial area of an upper surface of the side plate 320. The outer surface of the protruded portion 321 may be in contact with a side surface of the groove 121 of the first body 100.

The side plate 320 may include a third hole 322. The third hole 322 may be formed in the side plate 320. The third hole 322 may be formed by penetrating through the outer and inner side surfaces of the side plate 320. The second shield cover 400 may be exposed to the outside through the third hole 322. The third hole 322 may expose at least a portion of the side plate 420 of the second shield cover 400 to the outside.

The third hole 322 may include a plurality of third holes 322. The third hole 322 may include: a third-first hole being formed in the first side plate of the second body 300; a third-second hole being formed in the second side plate of the second body 300; a third-third hole being formed in the third side plate of the second body 300; and a third-fourth hole being formed in the fourth side plate of the second body 300. The third-first hole may be formed between a first corner of the second body 300 and a fourth corner of the second body 300. The third-first hole may be spaced apart from the first corner and the fourth corner of the second body 300. The third-first hole may include a plurality of third-first holes spaced apart from one another. The third-first hole may include five third-first holes spaced apart from one another. The third-second hole may be disposed between the first corner and the second corner of the second body 300. The third-second hole may be spaced apart from the first and second corners. The third-second hole may include a plurality of third-second holes spaced apart from one another. The third-second hole may include five third-second holes spaced apart from one another. The third-third hole may be disposed between a second corner of the second body 300 and a third corner of the second body 300. The third-third hole may be spaced apart from a second corner of the second body 300 and a third corner of the second body 300. The third-third hole may include a plurality of third-third holes spaced apart from one another. The third-third hole may contain five third-third holes spaced apart from one another. The third-fourth hole may be disposed between a third corner of the second body 300 and a fourth corner of the second body 300. The third-fourth hole may be spaced apart from a third corner of the second body 300 and a fourth corner of the second body 300. The third-fourth hole may include a plurality of third-fourth holes spaced apart from one another. The third-fourth hole may include five third-fourth holes spaced apart from one another. The plurality of third holes 322 may be formed in the same shape as one another. However, it is not limited thereto and may be formed and disposed in various shapes to maximize external exposure of the second shield cover 400. The third hole 322 may be formed in a shape different from that of the first hole 311. The cross-sectional area of the third hole 322 may be different from the cross-sectional area of the first hole 311.

The second body 300 may include a connector lead-out part 330. The connector lead-out part 330 may be coupled to the bottom plate 310. The connector lead-out part 330 may be disposed in the second hole 312 of the bottom plate 310. The connector lead-out part 330 may penetrate through the second hole 312 of the bottom plate 310. A connector 640 may be disposed inside the connector lead-out part 330. The connector lead-out part 330 may be formed of a plastic material. The connector lead-out part 330 may include a hole. A connector 640 may be disposed in the hole. The hole of the connector lead-out part 330 may accommodate at least a portion of the connector 460. Through this, the connector lead-out part 330 may fix the connector 640.

The camera module 10 may include a second shield cover 400. The second shield cover 400 may be formed of a metal material. The second shield cover 400 may include a bottom plate 410, a side plate 420 being extended from the bottom plate 410, and corners being disposed on the plurality of side plates 420. The bottom plate 410, the side plate 420, and the corner may be integrally formed. The bottom plate 410 may be in contact with the bottom plate 310 of the second body 300.

The second shield cover 400 may be coupled to the second body 300 in a way that waterproofing is possible. Depending on the use, waterproofing may satisfy IP52 or higher for waterproof and dustproof, and if it is installed outside of a vehicle, it may satisfy IP69K.

The diameter of the second shield cover 400 in a direction perpendicular to the optical axis direction may be smaller than the diameter of the second shield cover 400 in a direction perpendicular to the optical axis direction. The second shield cover 400 may be spaced apart from the first shield cover 200 in an optical axis direction. Through this, the first substrate 610 having a size larger than a diameter in a direction perpendicular to the optical axis direction of the second shield cover 400 may not be damaged by the first shield cover 200. A separation space may be formed between the second shield cover 400 and the first shield cover 200. A separation space may be formed between the upper end of the side plate 420 of the second shield cover 400 and the lower end of the side plate 220 of the first shield cover 200. At least a portion of the first substrate 610 may be disposed in a space between the first shield cover 200 and the second shield cover 400.

The bottom plate 410 may include a hole 411. The hole 411 may be formed in a shape corresponding to the second hole 312 of the second body 300. The hole 411 may be formed to have a size corresponding to that of the second hole 312 of the second body 300. At least a portion of the connector lead-out part 330 may be disposed in the hole 411. The connector lead-out part 330 may penetrate through the hole 411. The inner circumferential surface of the hole 411 may be in contact with at least a portion of an outer circumferential surface of the connector lead-out part 330.

At least a portion of the connector 640 may be disposed in the hole 411. The connector 640 may be penetrated through the hole 411.

The side plate 420 may be protruded above the second substrate 620. The side plate 420 may be protruded above the first surface of the second substrate 620. At least a portion of the side plate 420 may be protruded above the second substrate 620. An upper portion of the side plate 420 may be disposed higher than the second substrate 620. The side plate 420 may include a portion being protruded above the first surface of the second substrate 620. A portion of the side plate 420 being protruded above the second substrate 620 may be disposed between the first substrate 610 and the second substrate 620. A portion of the side plate 420 being protruded above the second substrate 620 may be disposed between the second surface of the first substrate 610 and the first surface of the second substrate 620. A portion of the side plate 420 being protruded above the second substrate 620 may not be overlapped with the first substrate 610 in a direction perpendicular to the optical axis direction.

The side plate 420 may include: a first side plate; a second side plate; a third side plate being disposed at an opposite side of the first side plate; and a fourth side plate being disposed at an opposite side of the second side plate. The outer side surface of the first side plate may be in contact with an inner side surface of the first side plate of the second body 300. The outer side surface of the second side plate may be in contact with an inner side surface of the second side plate of the second body 300. The outer side surface of the third side plate may be in contact with an inner side surface of a third side plate of the second body 300. The outer side surface of a fourth side plate may be in contact with an inner side surface of the fourth side plate of the second body 300.

The second shield cover 400 may include: a first corner being disposed on the first side plate and the second side plate; a second corner being disposed between the second side plate and the third side plate; a third corner disposed between the third side plate and the fourth side plate; and a fourth corner being disposed between fourth side plate and first side plate. An outer circumferential surface of a first corner of the second shield cover 400 may be in contact with an inner circumferential surface of a first corner of the second body 300. An outer circumferential surface of a second corner of the second shield cover 400 may be in contact with an inner circumferential surface of a second corner of the second body 300. An outer circumferential surface of a third corner of the second shield cover 400 may be in contact with an inner circumferential surface of a third corner of the second body 300. An outer circumferential surface of a fourth corner of the second shield cover 400 may be in contact with an inner circumferential surface of a fourth corner of the second body 300. The second shield cover 400 may be grounded with the second substrate 620. The outer surfaces of the second shield cover 400 and the connector 640 may be grounded.

The second shield cover 400 may be integrally formed by forming a metal. That is, the bottom plate 410, the side plate 420, and the corners of the second shield cover 400 may be integrally formed by molding metal. In more detail, the second shield cover 400 may be seated on a solid mold having a rectangular shape. At this time, the shape of the second shield cover 400 may be made by pressing the second shield cover 400 in a direction toward the mold. In this case, it is possible to solve the problem of forming a gap between the side plates being generated in a cover being formed by a method in which the plate material is being bent to form side plates followed by coupling of the formed side plates. That is, since the second shield cover 400 of the present invention is integrally formed with the side plate 420 and the corner, between the plurality of side plates 420 or between the side plates 420 and the corner 330 may not be spaced apart.

The second shield cover 400 may be treated with a metal surface. The second shield cover 400 may be pre-treated. A bonding surface of the second shield cover 400 with the second body 300 may be treated with a metal surface. The bonding surface of the second shield cover 400 with the second body 200 may be pre-treated. The second shield cover 400 may undergo a pretreatment process of the metal surface before insert injection into the second body 300. The second shield cover 400 may be formed of aluminum. At least a portion of the second shield cover 400 may be formed of aluminum. The second shield cover 400 may be formed of a metal material having high thermal conductivity. The pretreatment or metal surface treatment may refer to a process of removing oil attached to the metal surface and forming a coating layer or a surface treatment layer. When the bonding surface of the second shield cover 400 with the second body 300 is immersed in a special solution for a certain time, nano-sized pores S on the bonding surface of the second shield cover 400 with the second body 300 can be formed. Through this, a portion of the second body 300 made of plastic is melted by the heat generated during the insert injection process of the second shield cover 400 and the second body 300 and may flow into the pores S of the second shield cover 400. In this case, the bonding force, the coupling force, and the adhesion force between the second shield cover 400 and the second body 300 may be increased. In addition, if the bonding surface of the second shield cover 400 with the second body 300 is immersed in a special solution for a certain period of time, the coating layer C or the film layer on the bonding surface of the second shield cover 400 with the second body 300 can be formed. Through this, it is possible to prevent the interfacial separation phenomenon between the bonding surface of the second shield cover 400 and the second body 300. In addition, waterproofing between the second shield cover 400 and the second body 300 may be possible without a separate waterproof member or sealing member.

The second shield cover 400 may be fixed to the second body 200 through insert molding. The second shield cover 400 may be fixed to the second body 200 through insert molding. Insert injection or insert molding may refer to a molding method in which a metal member and a plastic member are integrated. A portion of the second body 200 may be melted by the heat generated during the insert injection process and introduced into the pores S generated during the pretreatment of the second shield cover 400.

The camera module 10 may include a lens module 500. The lens module 500 may be coupled to the first shield cover 200. At least a portion of the lens module 500 may be disposed in the first shield cover 200. At least a portion of the lens module 500 may be disposed in the first body 100. The lens module 500 may penetrate through the hole 211 of the upper plate 210 of the first shield cover 200.

The lens module 500 may include a lens 510. The lens 510 may be disposed inside the lens module 500. The lens 510 may be coupled to the lens module 500. At this time, the lens module 500 may be a lens barrel or a lens holder. The lens 510 may include a plurality of lenses 510. The lens 510 may be aligned with the image sensor 611. The optical axis may be aligned with the image sensor 611 of the lens 510. The optical axis of the lens 510 may coincide with the central axis of the image sensor 611. The lens module 500 may include an infrared filter (not shown) disposed between the lens 510 and the image sensor 611.

The camera module 10 may include a substrate assembly 600. The substrate assembly 600 may be disposed inside the second body 300. The substrate assembly 600 may be disposed in an internal space formed by the coupling of the first body 100 and the second body 300. At least a portion of the substrate assembly 400 may be disposed inside the first shield cover 200. The substrate assembly 400 may be disposed inside the second shield cover 400.

The substrate assembly 400 may include a first substrate 610. The first substrate 610 may include a printed circuit board. The first substrate 610 may include a rigid printed circuit board. An image sensor 611 may be disposed in the first substrate 610. At this time, the first substrate 610 may be referred to as a sensor substrate. The first substrate 610 may include a first surface facing the upper plate 110 of the first body 100 and a second surface disposed at an opposite side of the first surface. The image sensor 611 may be disposed in the first surface of the first substrate 610. The first substrate 610 may be coupled to the first shield cover 200. The first substrate 610 may be coupled to the first portion 221 of the side plate 220 of the first shield cover 200. The outer edge of the first surface of the first substrate 610 may be coupled to the first portion 221 of the side plate 220 of the first shield cover 200.

The first substrate 610 may be overlapped with the side plate 120 of the first body 100 in a direction perpendicular to the optical axis direction. The first substrate 610 may be disposed inside the first body 100. The first substrate 610 may not be overlapped with the coupling part 130 of the first body 100 in a direction perpendicular to the optical axis direction. The image sensor 611 may be overlapped with the coupling part 130 of the first body 100 in a direction perpendicular to the optical axis direction. The image sensor 611 may not be overlapped with the side plate 120 of the first body 100 in a direction perpendicular to the optical axis direction. The first substrate 610 may not be overlapped with the side plate 320 of the second body 300 in a direction perpendicular to the optical axis direction. The first substrate 610 may not be disposed inside the second body 300.

The substrate assembly 600 may include a second substrate 620. The second substrate 620 may include a printed circuit board. The second substrate 620 may include a rigid printed circuit board. The second substrate 620 may be disposed below the first substrate 610. The second substrate 620 may be spaced apart from the first substrate 610. The second substrate 620 may be spaced apart from the first substrate 610 in an optical axis direction. The second substrate 620 may supply power to the first substrate 610. The second substrate 620 may be disposed parallel to the first substrate 610. The second substrate 620 may be electrically connected to the connector 640. The second substrate 620 may include a first surface facing the first substrate 610 and a second surface being disposed at an opposite side of the second surface. A connector 640 may be disposed in the second surface of the second substrate 620.

The second substrate 620 may be overlapped with the side plate 320 of the second body 300 in a direction perpendicular to the optical axis direction. The second substrate 620 may be disposed inside the second body 300. The second substrate 620 may not be disposed inside the first body 100. The second substrate 620 may not be overlapped with the side plate 120 of the first body 100 in a direction perpendicular to the optical axis direction.

The substrate assembly 400 may include a third substrate 630. The third substrate 630 may include a flexible printed circuit board (FPCB). The third substrate 630 may electrically connect the first substrate 610 and the second substrate 620. One end of the third substrate 630 is connected to the first substrate 610, and the other end of the third substrate 630 may be connected to the second substrate 620. The third substrate 630 may have elasticity.

The board assembly 600 may include a connector 640. The connector 640 may be disposed in a second surface of the second substrate 420. The connector 640 may be fixed to a second surface of the second substrate 620. The connector 640 may be electrically connected to the second substrate 620. The connector 640 may electrically connect a cable (not shown) and the second substrate 620. A part of the connector 640 may be disposed inside the second shield cover 400, and the rest may be disposed inside the connector lead-out part 330 of the second body 300.

The connector 640 may include a first connector 641 being electrically connected to the second substrate 620 and a second connector 642 being extended from the first connector 641 and electrically connecting the first connector 641 and the cable. The first connector 641 may be disposed in a second surface of the second substrate 620. The first connector 641 may be fixed to a second surface of the second substrate 620. The first connector 641 may be electrically connected to the second substrate 620. The second connector 642 may be electrically connected to the first connector 641. The second connector 642 may be electrically connected to the cable. The second connector 642 may be disposed inside the connector lead-out part 330 of the second body 300. At least a portion of the second connector 642 may be disposed inside the connector lead-out part 330 of the second body 300, and the remaining portion of the second connector 642 may be disposed inside the second body 300.

The camera module 10 may include a spacer 700. The spacer 700 may be referred to as a shield can. The spacer 700 may be referred to as an electromagnetic wave shielding member. The spacer 700 may block electromagnetic interference (EMI) or electromagnetic waves. The spacer 700 may be formed of a metal material. The spacer 700 may be disposed between a plurality of substrates to serve to separate the plurality of substrates.

The spacer 700 may be disposed below the first substrate 610. The spacer 700 may be disposed above the second substrate 620. The spacer 700 may be disposed between the first substrate 610 and the second substrate 620. The spacer 700 may separate the first substrate 610 and the second substrate 620 from each other.

The spacer 700 may include a body part. The body part may include a plurality of body parts. The body part may include a first body part 710 and a second body part 720, a third body part 730 being disposed at an opposite side of the first body part 710, and a fourth body part 740 being disposed at an opposite side of the second body part 720. The first to fourth body parts 710, 720, 730, and 740 may be spaced apart from one another except for a portion being connected to the connection part 750. The first body part 710 and the third body part 730 may be symmetrically disposed.

The first body part 710 may include a first protrusion 711 being formed on an upper end of the first body part 710. The first protrusion 711 may include two first protrusions 711 being spaced apart from each other. The first protrusion 711 may be disposed on a second surface of the first substrate 610. The first body part 710 may include a groove 712 being formed between the two first protrusions 711. The width of the groove 712 of the first body part 710 may be smaller than the width of the groove 722 of the second body part 720. Through this, the third substrate 630 may pass through the groove 722 being formed in the second body part 720 to electrically connect the first substrate 610 and the second substrate 620.

The first body part 710 may include a coupling part 713. The coupling part 713 may be extended downward from a lower end of the first body part 710. The coupling part 713 may include a first hole 714. At least a portion of the second protrusion 715 may be disposed in the first hole 714. The first hole 714 may be formed to prevent interference with the second protrusion 715. The coupling part 713 may include a second protrusion 715. The second protrusion 715 may be formed by being bent from a portion of a lower end of the coupling part 713. The second protrusion 715 may include a bent portion for supporting the second surface of the second substrate 620. An end of the bent portion of the second protrusion 715 may be disposed in the first hole 714. The second substrate 620 may be fixed to the spacer 700 through the second protrusion 715. The coupling part 713 may include a second hole 716. The second hole 716 may be overlapped with the second hole 736 of the coupling part 733 of the third body part 730 in a direction perpendicular to the optical axis direction. A second hole 716 may be formed to create a third protrusion 717.

The coupling part 713 may include a third protrusion 717. The third protrusion 717 may be formed by cutting a partial area of the coupling part 713 and pressing the cut area outward. At this time, the cut area may be the second hole 716. The third protrusion 717 may include a first area being extended inclinedly with respect to the coupling part 713 and a second area being extended parallel to the coupling part 713 from the first area.

The second body part 720 may include a protrusion 721 being formed on an upper end of the second body part 720. The protrusion 721 may include two protrusions 721 being spaced apart from each other. The protrusion 721 may be disposed in a second surface of the first substrate 610. The second body part 720 may include a groove 722 being formed between the two protrusions 721. The width of the groove 722 of the second body part 720 may be smaller than the width of the groove 712 of the first body part 710. The width of the groove 722 of the second body part 720 may be smaller than the width of the groove 732 of the second body part 730. Through this, the third substrate 630 may pass through the groove 722 being formed in the second body part 720 to electrically connect the first substrate 610 and the second substrate 620.

The third body part 730 may include a first protrusion 731 being formed in an upper end of the third body part 730. The first protrusion 731 may include two first protrusions 731 being spaced apart from each other. The first protrusion 731 may be disposed in a second surface of the first substrate 610. The third body part 730 may include a groove 732 being formed between the two first protrusions 731. The width of the groove 732 of the third body part 730 may be smaller than the width of the groove 722 of the second body part 720. Through this, the third substrate 630 may pass through the groove 722 being formed in the second body part 720 to electrically connect the first substrate 610 and the second substrate 620.

The third body part 730 may include a coupling part 733. The coupling part 733 may be extended downward from a lower end of the third body part 730. The coupling part 733 may include a first hole 734. At least a portion of the second protrusion 735 may be disposed in the first hole 734. The first hole 734 may be formed to prevent interference with the second protrusion 735. The coupling part 733 may include a second protrusion 735. The second protrusion 735 may be formed by being bent from a portion of the lower end of the coupling part 733. The second protrusion 735 may include a bent portion for supporting the second surface of the second substrate 620. An end portion of the bent portion of the second protrusion 735 may be disposed in the first hole 734. The second substrate 620 may be fixed to the spacer 700 through the second protrusion 735. The coupling part 733 may include a second hole 736. The second hole 736 may be overlapped with the second hole 736 of the coupling part 733 of the third body part 730 in a direction perpendicular to the optical axis direction. The second hole 736 may be formed to create a third protrusion 737.

The coupling part 733 may include a third protrusion 737. The third protrusion 737 may be formed by cutting a partial area of the coupling part 733 and pressing the cut area outward. At this time, the cut area may be the second hole 736. The third protrusion 737 may include a first area being extended inclinedly with respect to the coupling part 733 and a second area being extended parallel to the coupling part 733 from the first area.

The fourth body part 740 may include a protrusion 741 being formed on an upper end of the fourth body part 740. The protrusion 741 may be disposed in a second surface of the first substrate 610. The fourth body part 740 may include a coupling part 742. The coupling part 742 may be extended downward from a lower end of the fourth body part 740. The coupling part 742 may be extended downward from a partial area of a lower end of the fourth body part 740. The coupling part 742 may include a hole 743. A portion of the second substrate 620 may be disposed in the hole 742. A portion of the second substrate 620 may be fit-coupled into the hole 743 to fix the second substrate 620.

The spacer 700 may include a connection part 750. The connection part 750 may connect the first to fourth body parts 710, 720, 730, and 740. The connection part 750 may include a curved surface. The connection part 750 may be disposed in the first surface of the second substrate 620. The connection part 750 may press the second substrate 620 downward to fix the second substrate 620.

The spacer 700 may be disposed in the second shield cover 400. The spacer 700 may be spaced apart from the second shield cover 400. The spacer 700 may be spaced apart from the bottom plate 410 of the second shield cover 400 in an optical axis direction. The spacer 700 may be spaced apart from the side plate 420 of the second shield cover 400 in a direction perpendicular to the optical axis direction. The spacer 700 may be formed of a metal material. The thickness of the spacer 700 may be thinner than the thickness of the side plate 420 of the second shield cover 400. The spacer 700 may face the side plate 420 of the second shield cover 400. The thickness of the spacer 700 may be thinner than the thickness of the side plate 220 of the first shield cover 200.

The camera module 10 may include a sealing member 800. The sealing member 800 may be referred to as any one of a gasket and a waterproof member. The sealing member 800 may be formed of an elastic material. The sealing member 800 may be disposed on the first shield cover 200. The sealing member 800 may be disposed between the first shield cover 200 and the lens module 500. The sealing member 800 may be disposed in a space between the first shield cover 200 and the lens module 500. The height of the sealing member 800 in an optical axis direction may be smaller after assembly than before assembly. That is, the sealing member 800 may be disposed between the first shield cover 200 and the lens module 500 in a compressed state in an optical axis direction to perform a waterproof function. Through this, it is possible to prevent moisture from penetrating through the space between the first shield cover 200 and the lens module 500.

Hereinafter, a camera module according to a second embodiment of the present invention will be described.

Figure 23:
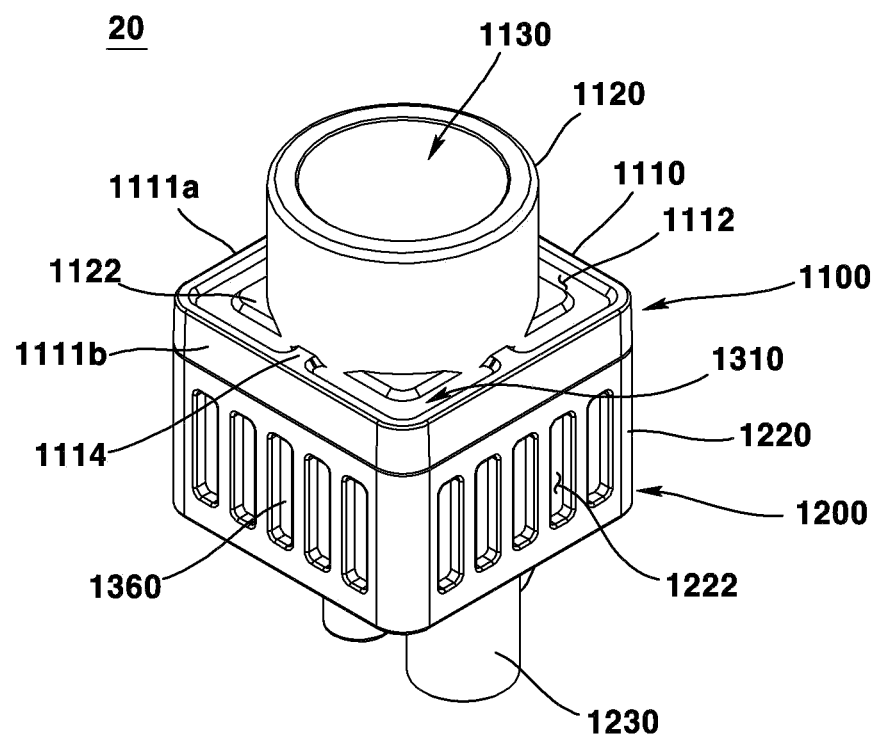
FIG. 23 is a perspective view of a camera module according to a second embodiment of the present invention.
Figure 24:
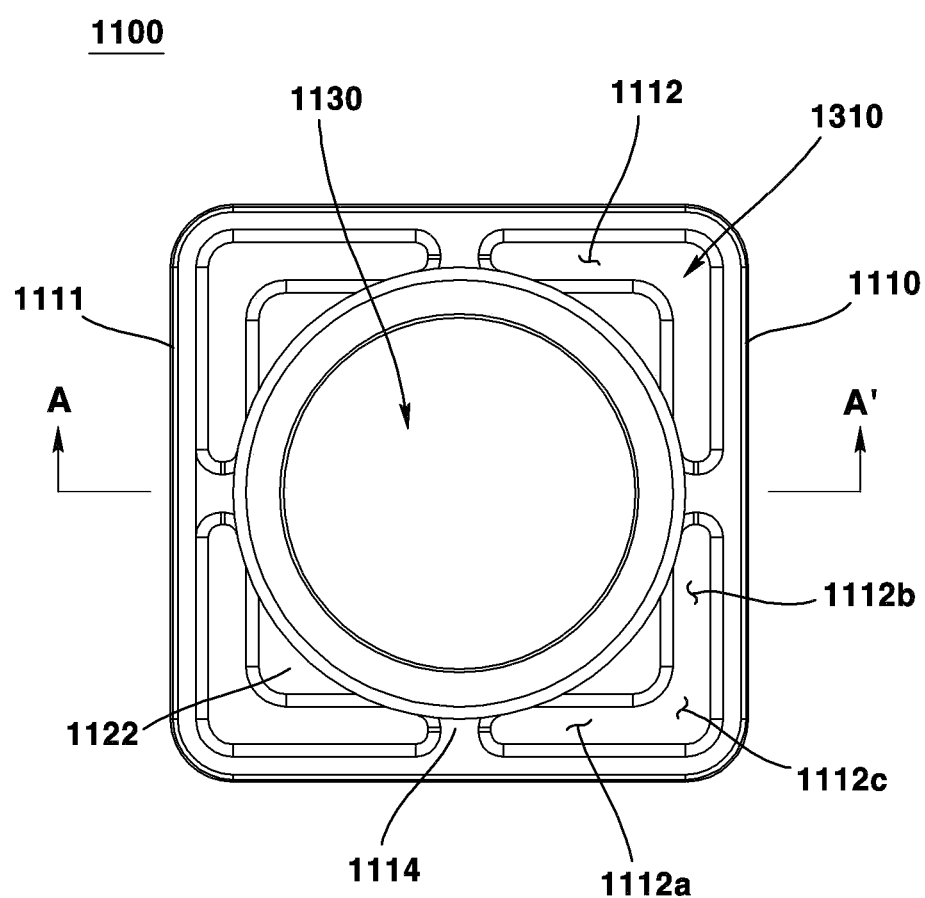
FIG. 24 is a plan view illustrating an upper surface of a camera module according to a second embodiment of the present invention.
Figure 25:
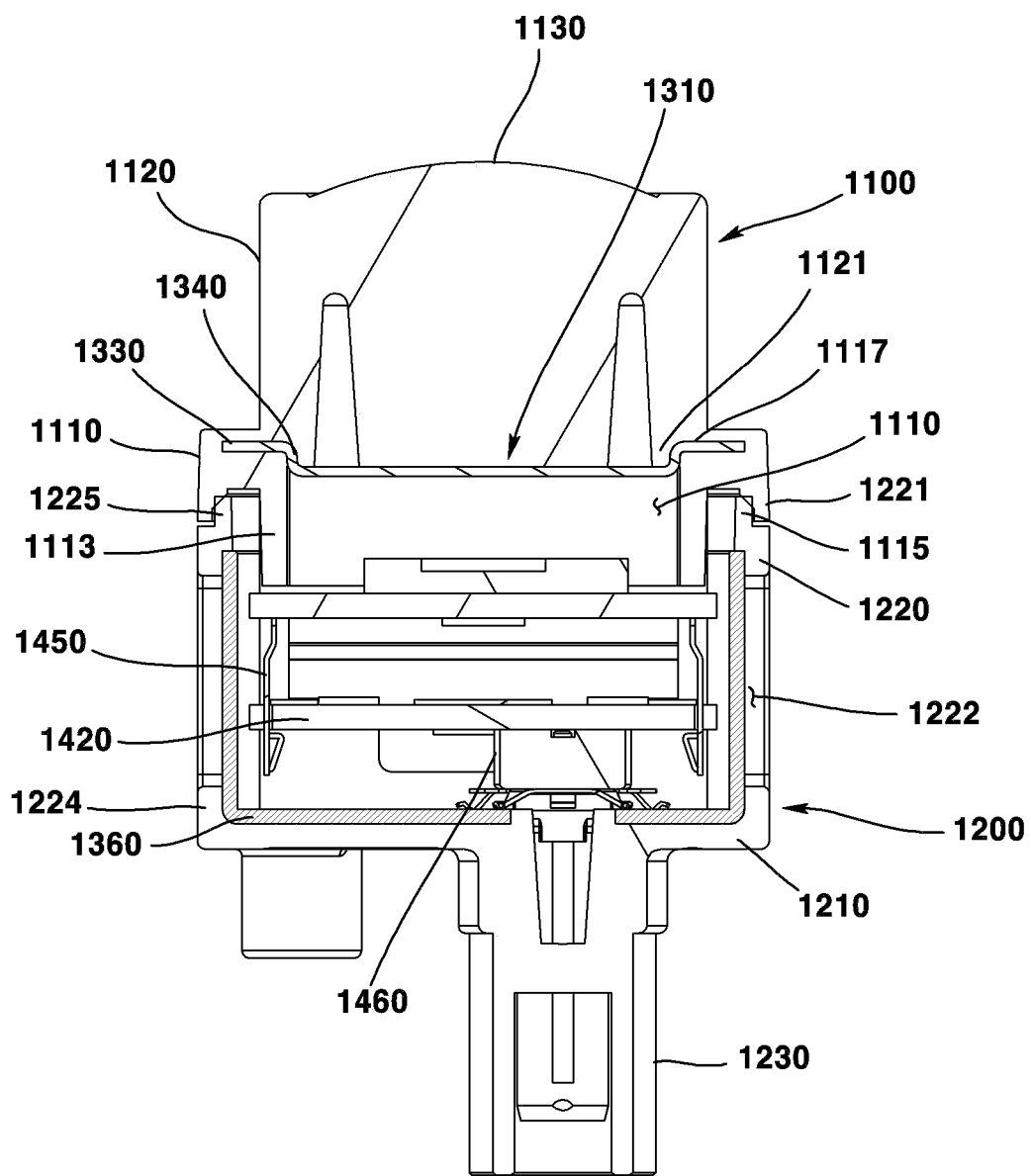
FIG. 25 is a cross-sectional view taken along line A-A' of FIG. 24.
Figure 26:
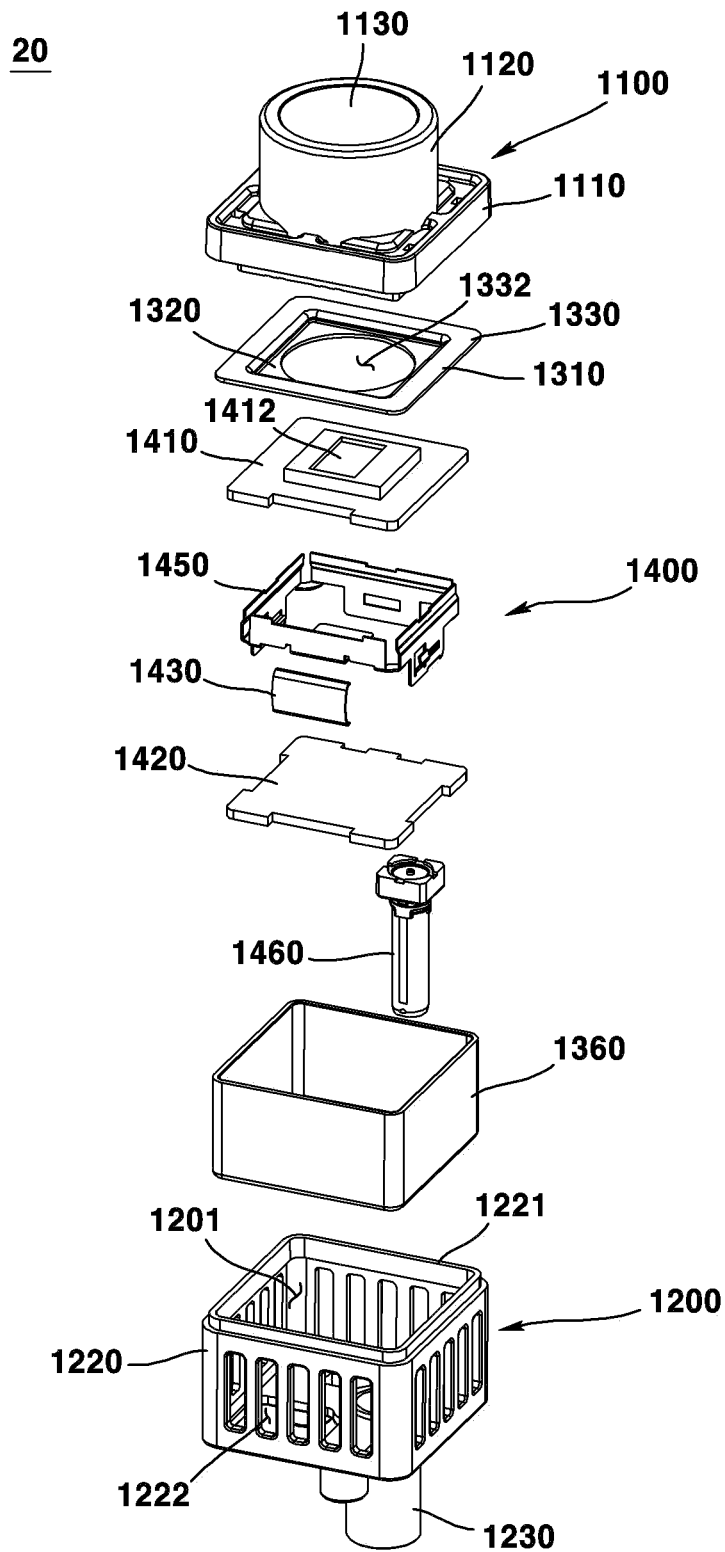
FIG. 26 is an exploded perspective view of a camera module according to a second embodiment of the present invention.
Figure 27:
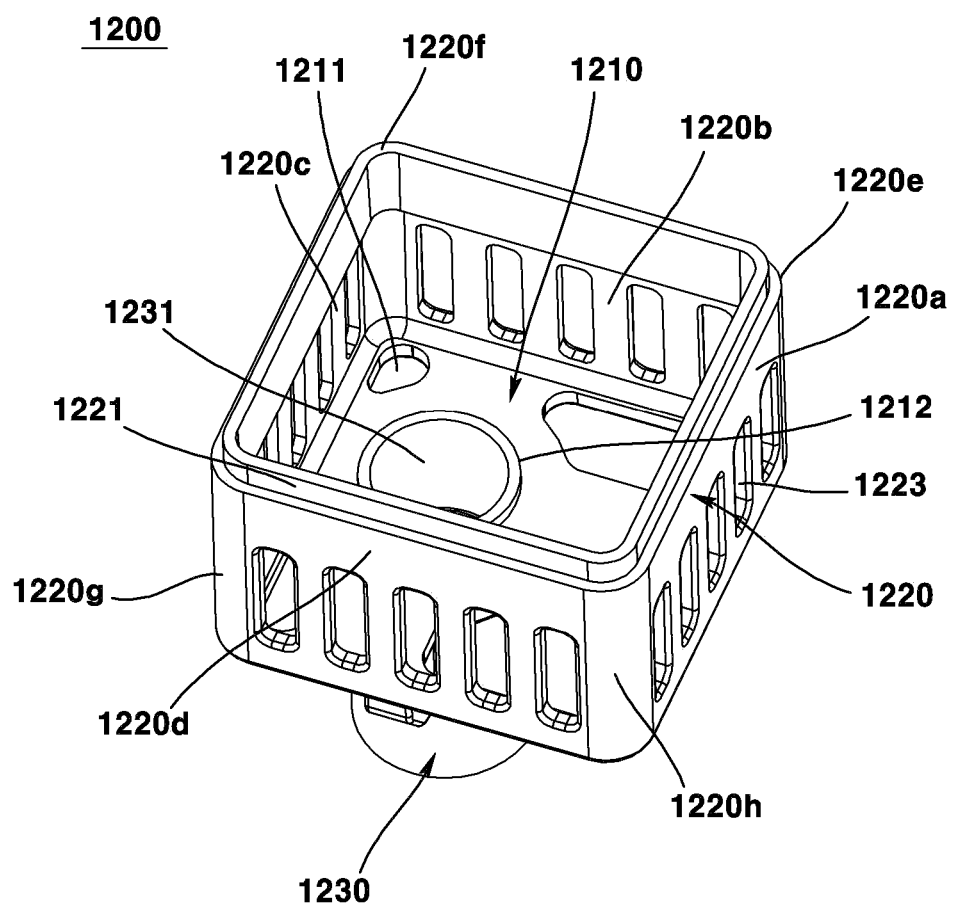
FIG. 27 is a perspective view of a second body according to a second embodiment of the present invention.
Figure 28:
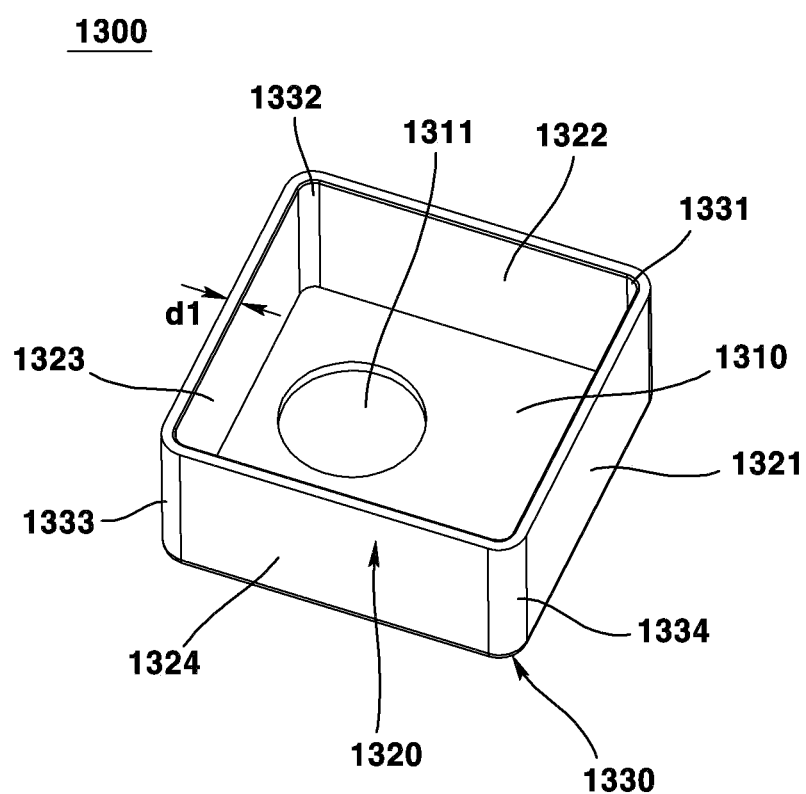
FIG. 28 is a perspective view of a second shield can, according to a second embodiment of the present invention.
Figure 29:
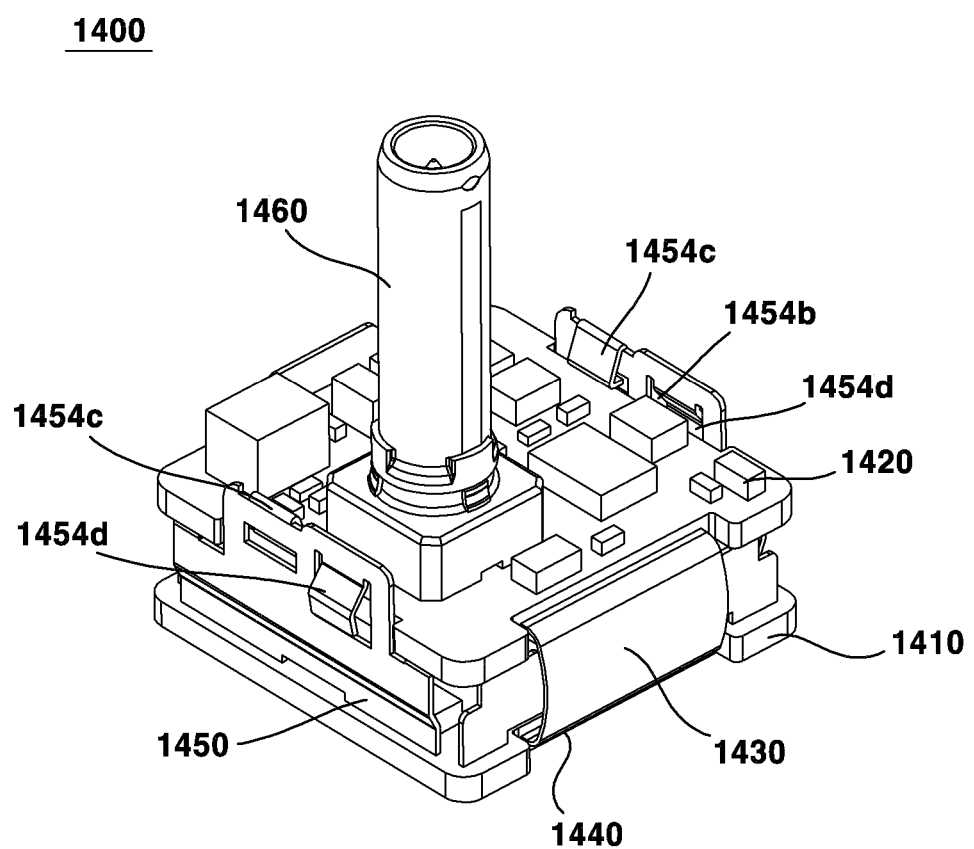
FIG. 29 is a perspective view of a substrate assembly according to a second embodiment of the present invention.
Figure 30:
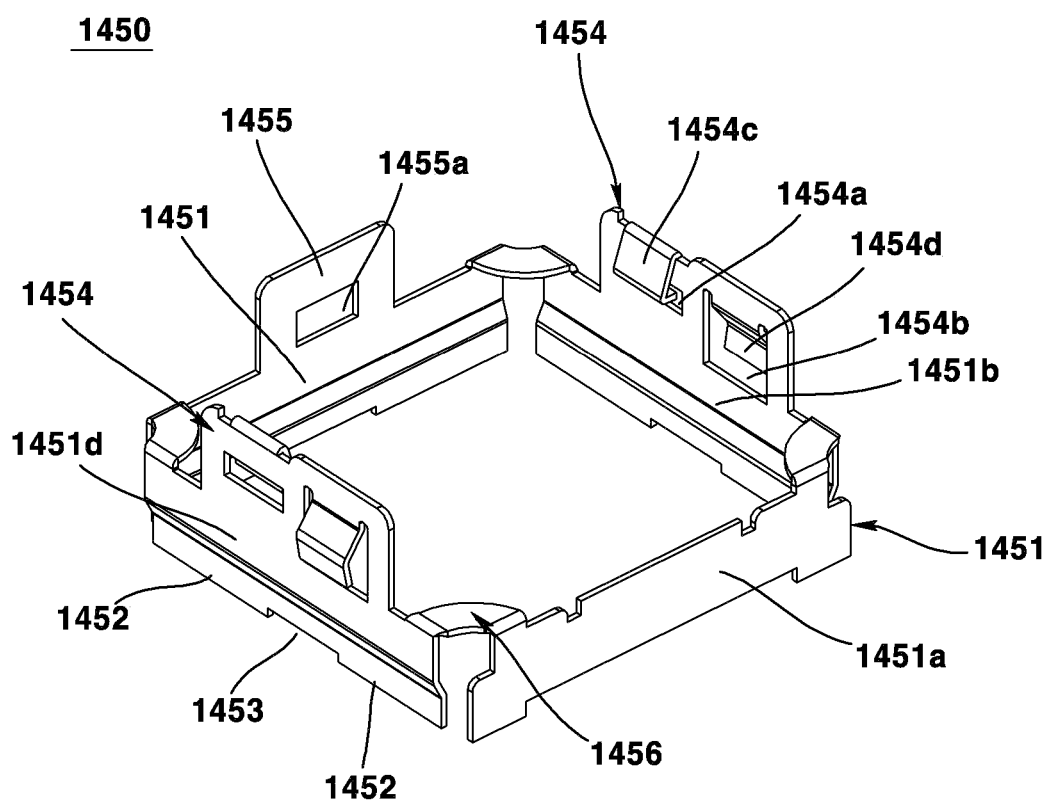
FIG. 30 is a perspective view of a spacer according to a second embodiment of the present invention.
Figure 31:
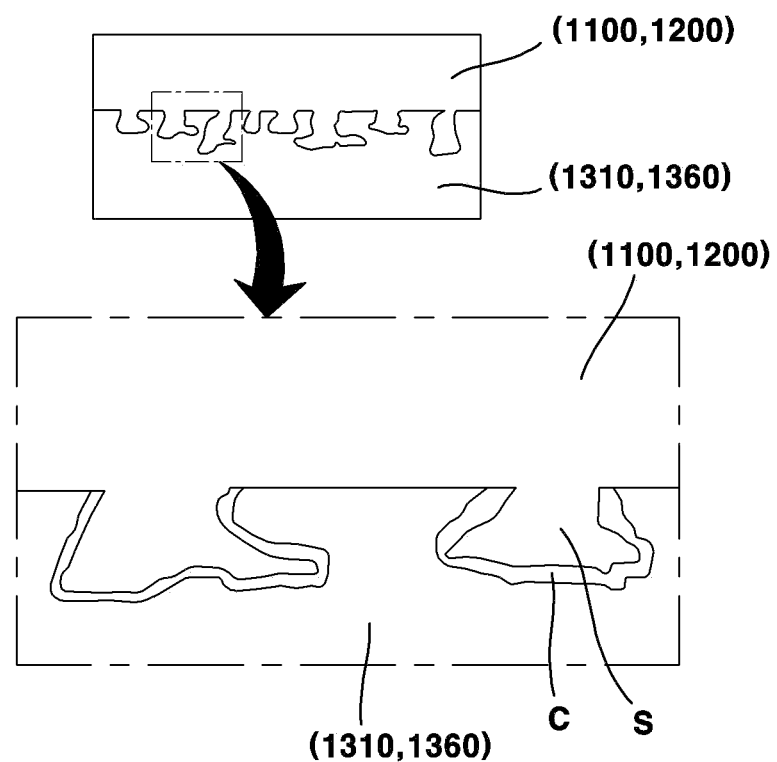
FIG. 31 is a view illustrating a coupling surface of a first body or a second body and a shield can, according to a second embodiment of the present invention.

FIG. 23 is a perspective view of a camera module according to a second embodiment of the present invention; FIG. 24 is a plan view illustrating an upper surface of a camera module according to a second embodiment of the present invention; FIG. 25 is a cross-sectional view taken along line A-A' of FIG. 24; FIG. 26 is an exploded perspective view of a camera module according to a second embodiment of the present invention; FIG. 27 is a perspective view of a second body according to a second embodiment of the present invention; FIG. 28 is a perspective view of a second shield can, according to a second embodiment of the present invention; FIG. 29 is a perspective view of a substrate assembly according to a second embodiment of the present invention; FIG. 30 is a perspective view of a spacer according to a second embodiment of the present invention; and FIG. 31 is a view illustrating a coupling surface of a first body or a second body and a shield can, according to a second embodiment of the present invention.

Referring to FIGS. 23 to 31, the camera module 20 according to a second embodiment of the present invention may be a vehicle camera module. The camera module 20 may be coupled to a vehicle. The camera module 20 may be used in any one or more among a front camera, a side camera, a rear camera, and a black box of a vehicle. The camera module 20 may be disposed in front of a vehicle. The camera module 20 may be disposed at a rear of a vehicle. The camera module 20 may be coupled to a windshield of a vehicle. The camera module 20 may be coupled to a windshield at a front or rear of a vehicle. The camera module 20 may be disposed at a side of a vehicle. The camera module 20 may photograph a subject and output it as an image on a display (not shown).

The camera module 20 may include a first body 1100. The first body 1100 may be referred to as any one of a front body, an upper housing, and a first housing. The first body 1100 may include a body part 1110. The first body 1100 may include a barrel part 1120. The first body 1100 may include a lens 1130. The body part 1110, the barrel part 1120, and the lens 1130 of the first body 1100 may be integrally formed. Any two or more among the body part 1110, the barrel part 1120, and the lens 1130 of the first body 1100 may be integrally formed. In a modified embodiment, the body part 1110, the barrel part 1120, and the lens 1130 may be formed separately.

The body part 1110 may be coupled to the barrel part 1120. The first body part 1110 may be integrally formed with the barrel part 1120. The body part 1110 may be formed of a plastic material. The body part 1110 may be disposed above a second body 1200, which will be described later. The body part 1110 may be coupled to the second body 1200. The lower end of the body part 1110 may be fixed to the second body 1200. The body part 1110 may be coupled to the second body 1200 by any one among ultrasonic welding, laser welding, and thermal welding. In a modified embodiment, the body part 1110 may be coupled to the second body 1200 by an adhesive. The body part 1110 may be coupled to a first substrate 1410 of a substrate assembly 1400, which will be described later.

The body part 1110 may be formed in a rectangular shape with an open lower portion. At this time, the corner of the body part 1110 may be formed to be rounded. The body part 1110 may include an upper plate 1111a and a side plate 1111b being extended from the upper plate 1111a. The upper plate 1111a may be formed in a rectangular shape. The upper plate 1111a may be extended outwardly from the outer circumferential surface of a lower end of the barrel part 1120. The side plate 1111b may be extended downward from an outer edge of the upper plate 1111a. A plurality of side plates 1111b may be provided. The side plate 1111b may include four side plates. The side plate 1111b may be formed in a square plate shape. The side plate 1111b may include a first side plate and a second side plate, a third side plate disposed at an opposite side of the first side plate, and a fourth side plate disposed at an opposite side of the second side plate. The side plate 1111b may include first to fourth corners respectively disposed between the first to fourth side plates. Each of the first to fourth corners may include a round shape at least in part.

The body part 1110 may include a first protruded portion 1113. The first protruded portion 1113 may be protruded from a lower surface of the upper plate 1111a. The first protruded portion 1113 may be disposed inside the second protruded portion 1115 of the body part 1110, which will be described later. The first protruded portion 1113 may be coupled to the first substrate 1410. The first protruded portion 1113 may be coupled to an outer edge of the first substrate 1410. The first protruded portion 1113 may be formed in a shape corresponding to the outer edge of the first substrate 1410. A lower end of the first protruded portion 1113 may be coupled to the first substrate 1410. The lower end of the first protruded portion 1113 may be fixed to the first substrate 1410 by an adhesive.

The first protruded portion 1113 may be protruded more than the second protruded portion 1115. The length of the first protruded portion 1113 in an optical axis direction may be longer than the length of the second protruded portion 1115 in an optical axis direction. The maximum length of the first protruded portion 1113 in an optical axis direction may be longer than the length of the second protruded portion 1115 in an optical axis direction. The first protruded portion 1113 may be spaced apart from the second protruded portion 1115. The first protruded portion 1113 may be spaced apart from the second protruded portion 1115 in a direction perpendicular to the optical axis direction. At least a portion of the first protruded portion 1113 may face the second protruded portion 1115.

The first protruded portion 1113 may be protruded more than the side plate 1111b. The length of the first protruded portion 1113 in an optical axis direction may be longer than the length of the side plate 1111b in an optical axis direction. The first protruded portion 1113 may include: a first-first protruded portion facing the first side plate; a first-second protruded portion facing the second side plate; a first-third protruded portion facing the third side plate; and first-fourth protruded portion facing the fourth side plate. The first-first to first-fourth protruded portions may be integrally formed. The first protruded portion 1113 may be spaced apart from the side plate 1111b. The first protruded portion 1113 may be spaced apart from the side plate 1111b in a direction perpendicular to the optical axis direction.

A space portion 1110a being partitioned from another area by the inner surface of the first protruded portion 1113 may be formed at an inner side of the body part 1110. The space portion 1110a may have an open lower portion, and an upper portion may be covered through the lower surface of the barrel portion 1120 and the lens 1130.

The body part 1110 may include a second protruded portion 1115. The second protruded portion 1115 may be protruded from a lower surface of the upper plate 1111a. The second protruded portion 1115 may be disposed at an outer side of the first protruded portion 1113. The second protruded portion 1115 may be coupled to the second body 1200. At least a portion of the second protruded portion 1115 may be fusion-bonded to the second body 1300. At least a portion of the second protruded portion 1115 may be coupled to the second body 1200 by any one among ultrasonic welding, laser welding, and thermal welding. In a modified embodiment, the second protruded portion 1115 may be fixed to the second body 1200 by an adhesive. Or, a portion of the second protruded portion 1115 may be fusion-bonded to the second body 1200, and the remaining portion may be bonded by an adhesive.

The second protruded portion 1115 may not be protruded lower than the first protruded portion 1113. The length of the second protruded portion 1115 in an optical axis direction may be shorter than the length of the first protruded portion 1113 in an optical axis direction. The maximum length of the second protruded portion 1115 in an optical axis direction may be shorter than the length of the first protruded portion 1113 in an optical axis direction. The second protruded portion 1115 may face at least a portion of the first protruded portion 1113. The second protruded portion may include: a second-first protruded portion facing the first-first protruded portion; a second-second protruded portion facing the first-second protruded portion; a second-third protruded portion facing the first-third protruded portion; and a second-fourth protruded portion facing the first-fourth protruded portion. The second-first to second-fourth protruded portions may be integrally formed. The second protruded portion 1115 may include four corner protruded portions being disposed between the second-first to second-fourth protruded portions. The four corner protruded portions of the second protruded portion 1115 may be formed at positions corresponding to the four corners of the body part 1110. The second protruded portion 1115 may be spaced apart from the first protruded portion 1113. The second protruded portion 1115 may be spaced apart from the first protruded portion 1113 in a direction perpendicular to the optical axis direction.

The second protruded portion 1115 may include a first side surface facing the first protruded portion 1113 and a second side portion being disposed at an opposite side of the first side and being in contact with the second side plate 1111b. The length of the first side surface of the second protruded portion 1115 in an optical axis direction may be shorter than the length of the second side of the second protruded portion 1115 in an optical axis direction.

The second protruded portion 1115 may include an inclined surface. The inclined surface may be inclined in a direction from the first side surface of the second protruded portion 1115 toward the second side surface of the second protruded portion 1115. The length of the second protruded portion 1115 in an optical axis direction may increase as it travels from the first side surface of the second protruded portion 1115 toward the second side surface of the second protruded portion 1115. The inclined surface may be fusion-bonded with the second body 1200. At least a portion of the inclined surface may be fusion-bonded with the second body 1200.

The first body 1100 may include a barrel part 1120. The barrel part 1120 may be a lens barrel. The barrel part 1120 may be formed of a plastic material. The barrel part 1120 may be disposed in the body part 1110. The barrel part 1120 may be extended from an upper surface of the body part 1110. The barrel part 1120 may be integrally formed with the body part 1110. In a modified embodiment, the barrel part 1120 may be coupled to the body part 1110. In this case, the barrel part 1120 may be fixed to the body part 1110 by an adhesive. The barrel part 1120 may accommodate the lens 1130 therein. The barrel part 1120 may include a hole. A lens 1130 may be disposed in the hole of the barrel 1120. The inner circumferential surface of the hole of the barrel 1120 may have a shape and size corresponding to the outer circumferential shape of the lens 1130.

The first body 1100 may include a lens 1130. The lens 1130 may be disposed in the barrel part 1120. The lens 1130 may be coupled to the barrel part 1120. The lens 1130 may be disposed in a hole of the barrel part 1120. The lens 1130 may include a plurality of lenses 1130. The lens 1130 may be aligned with an image sensor 1412, which will be described later. The optical axis of the lens 1130 may be aligned with the image sensor 1412. The optical axis of the lens 1130 may coincide with the optical axis of the image sensor 1412. The first body 1100 may include an infrared filter (IR filter) being disposed between the lens 1130 and the image sensor 1412.

The camera module 20 may include a second body 1200. The second body 1200 may be referred to as any one among a rear body, a lower housing, and a second housing. The second body 1200 may be formed in a rectangular shape with an open upper portion. The second body 1200 may be formed of a plastic material. The second body 1200 may be disposed below the first body 1100. The second body 1200 may be coupled with the first body 1100. The second body 1200 may be fusion-bonded to the first body 1100. The second body 1200 may be coupled to the first body 1100 by any one among ultrasonic welding, laser welding, and thermal welding. At this time, ultrasonic welding may mean a process in which the first body 1100 is vibrated with pressure while the second body 1200 is fixed so that the fusion part of the second body 1200 and the first body 1100 is fused and integrated. The second body 1200 may form an internal space through combination with the first body 1100.

The second body 1200 may include a bottom plate 1210. The bottom plate 1210 may face the upper plate 1111a of the body part 1110 of the first body 1100. The bottom plate 1210 may be spaced apart from the upper plate 1111a of the body part 1110 of the first body 1100 in the optical axis direction. The bottom plate 1210 may be parallel to the upper plate 1111a of the body part 1110 of the first body 1100. The bottom plate 1210 may be formed in a rectangular shape. At this time, the corner of the bottom plate 1210 may include a round shape at least in part.

The bottom plate 1210 may include a first hole 1211. The first hole 1211 may be formed by penetrating the upper surface and the lower surface of the bottom plate 1210. The first hole 1211 may expose a second shield can 1360, which will be described later, to the outside. Through this, heat generated in the internal space of the first body 1100 and the second body 1200 may be discharged to the outside. Through this, the heat dissipation function of the camera module 20 may be performed. The first hole 1211 may be spaced apart from a third hole 1212, which will be described later.

The first hole 1211 may include a plurality of first holes 1211. The plurality of first holes 1211 may have different shapes. Cross-sectional areas of the plurality of first holes 1211 may be different from each other. The sizes of the plurality of first holes 1211 may be different from each other. The plurality of first holes 1211 may be disposed avoiding the holes 1231 of the connector lead-out part 1230. The plurality of first holes 1211 may have different shapes and sizes to avoid the holes 1231 of the connector lead-out part 1230. Through this, the area being exposed to the outside through the bottom plate 1210 of the second body 1200 excluding the hole 1231 of the connector lead-out part 1230 of the second shield can 1360 can be maximized. At this time, the hole 1231 of the connector lead-out part 1230 may be disposed at an optimal position to minimize the size of the camera module 20, and in this case, the plurality of first holes 1211 are connected to the connector. It may be formed in a size and shape to maximize the exposure area of the second shield can 1360 while avoiding the hole 1231 of the lead-out part 1230. The plurality of first holes 1211 may include four first holes 1211 being spaced apart from one another.

The bottom plate 1210 may include a third hole 1212. The third hole 1212 may be spaced apart from the first hole 1211. The third hole 1212 may be formed in a circular shape. In the third hole 1212, which will be described later, a connector lead-out part 1230 may be disposed. The connector lead-out part 1230 may penetrate into the third hole 1212. A connector 1460 may pass through the second hole 1212, which will be described later. The bottom plate of the second shield can 1360 may be disposed on the bottom plate 1210, which will be described later. The bottom plate of the second shield can 1360 may be in surface contact with the bottom plate 1210. The bottom plate of the second shield can 1360 may be coupled to the bottom plate 1210 by insert injection.

The second body 1200 may include a side plate 1220. The side plate 1220 may be extended from the bottom plate 1210. The side plate 1220 may be extended from an outer edge of the bottom plate 1210. A second shield can 1360 may be disposed in the side plate 1220. A second shield can 1360 may be in surface contact with an inner surface of the side plate 1220. The side plate of the second shield can 1360 may be coupled to the side plate 1220 by insert injection. The upper end of the side plate 1220 may be coupled to the first body 1100. The outer side surface of the side plate 1200 may be disposed on the same plane as the outer side surface of the side plate 1111*b* of the first body 1100.

The side plate 1220 may include a first area 1224 in which the second hole 1222 is formed, and a second area 1225 being extended from the first area 1224 and in which the second hole 1222 is not formed. The first area 1224 of the side plate 1220 may be attached to the second shield can 1360. The second area 1225 of the side plate 1220 may not attached to the second shield can 1360. The inner side surface of the side plate 1220 may include a step structure being formed by the first area 1224 and the second area 1225. The inner side surface of the first area 1224 of the side plate 1220 may be disposed at an outer side of the inner side surface of the second area 1225 of the side plate 1220. The inner side surface of the second area 1225 of the side plate 1220 may be protruded more inward than the inner side surface of the first area 1224 of the side plate 1220.

A side plate of the second shield can 1360 may be disposed in the first area of the side plate 1200. The side plate of the second shield can 1360 may be attached to the first area of the side plate 1200. The side plate of the second shield can 1360 may directly in contact with and attached to the first area of the side plate 1200. The coating layer of the second shield can 1360 may be attached to a first area of the side plate 1200. The side plate 1220 may include: a first side plate 1220*a*; a second side plate 1220*b*; a third side plate 1220*c* being disposed at an opposite side of the first side plate 1220*a*; and a fourth side plate 1220*d* being disposed at an opposite side of second side plate 1220*b*. The side plate 1220 may include: a first corner 1220*e* being disposed between the first side plate 1220*a* and the second side plate 1220*b*; a second corner 1220*f* being disposed between the second side plate 1220*b* and the third side plate 1220*c*; a third corner 1220*g* being disposed between the third side plate 1220*c* and the fourth side plate 1220*d*; and a fourth corner 1220*h* being disposed between the fourth side plate 1220*d* and the first side plate 1220*a*. The first to fourth corners 1220*e*, 1220*f*, 1220*g*, and 1220*h* of the side plate 1220 may have a round shape.

The side plate 1220 may include a third protruded portion 1221. The third protruded portion 1221 may be protruded upward from an upper end of the side plate 1220. The third protruded portion 1221 may be protruded upward from an upper surface of the side plate 1220. The third protruded portion 1221 may be in contact with the second protruded portion 1115 of the first body 1100. The third protruded portion 1221 may be disposed in an inclined surface of the second protruded portion 1115 of the first body 1100. The third protruded portion 1221 may be coupled to at least a portion of the second protruded portion 1115 of the first body 1100. The third protruded portion 1221 may be fusion-bonded with at least a portion of the second protruded portion 1115 of the first body 1100. At this time, fusion bonding may mean any one among ultrasonic welding, laser welding, and thermal welding. The third protruded portion 1221 may be protruded from a partial area of an upper surface of the side plate 1220. The outer side surface of the third protruded portion 1221 may be in contact with an inner side surface of the side plate 1111*b* of the first body 1100. A portion of the third protruded portion 1221 is in contact with an inclined surface of the second protruded portion 1115 of the first body 1100 by fusion, and the remaining portion of the third protruded portion 1221 may be in contact with the side plate 1111*b* of the first body 1100.

The side plate 1220 may include an upper surface. The upper surface may mean a surface facing the body part 1110 of the first body 1100. The upper surface may include a first area from which the third protruded portion 1221 is protruded and a second area from which the third protruded portion 1221 is not protruded. The second area may be disposed more outside than the first area. The lower end of the side plate 1111*b* of the first body 1100 may be disposed in a second area of the upper surface. The second area of the upper surface may be coupled with a lower end of the side plate 1111*b* of the first body 1100. The second area and the third protruded portion 1221 of the upper surface may form a step structure. The second area and the third protruded portion 1221 of the upper surface may be disposed to have a step.

The side plate 1220 may include a second hole 1222. The second hole 1222 may be formed in the side plate 1220. The second hole 1222 may be formed by being penetrated through an outer side surface and an inner side surface of the side plate 1220. The second shield can 1360 may be exposed to the outside through the second hole 1222. The second hole 1222 may expose at least a portion of a side plate of the second shield can 1360 to the outside.

The second hole 1222 may include a plurality of second holes 1222. The second hole 1222 may comprise: a second-first hole being formed in the first side plate 1220*a*; a second-second hole being formed in the second side plate 1220*b*; a second-third hole being formed in the third side plate 1220*c*; and a second-fourth hole being formed in the fourth side plate 1220*d*. The second-first hole may be formed between the first corner 1220*e* and the fourth corner 1220*h*. The second-first hole may be spaced apart from the first corner 1220*e* and the fourth corner 1220*h*. The second-first hole may include a plurality of second-first holes being spaced apart from each other. The second-first hole may include five second-first holes being spaced apart from one another. The second-second hole may be disposed between the first corner 1220*e* and the second corner 1220*f*. The second-second hole may be spaced apart from the first corner 1220*e* and the second corner 1220*f*. The second-second hole may include a plurality of second-second holes being spaced apart from each other. The second-second hole may include five second-second holes being spaced apart from one another. The second-third hole may be disposed between the second corner 1220*f* and the third corner 1220*g*. The second-third hole may be spaced apart from the second corner 1220*f* and the third corner 1220*g*. The second-third hole may include a plurality of second-third holes being spaced apart from one another. The second-third hole may include five second-third holes being spaced apart from one another. The second-fourth hole may be disposed between the third corner 1220*g* and the fourth corner 1220*h*. The second-fourth hole may be spaced apart from the third corner 1220*g* and the fourth corner 1220*h*. The second-fourth hole may include a plurality of second-fourth holes being spaced apart from one another. The second-fourth hole may include five second-fourth holes being spaced apart from one another. The plurality of second holes 1222 may be formed to have the same shape as one another. However, it is not limited thereto and may be formed and disposed in various shapes to maximize external exposure of the second shield can 1360. The second hole 1222 may be formed in a shape different from that of the first hole 1211. A cross-sectional area of the second hole 1222 may be different from a cross-sectional area of the first hole 1211.

The second hole 1222 may be disposed in first to fourth side plates 1220*a*, 1220*b*, 1220*c*, and 1220*d* of the second body 1200, respectively. The second hole 1222 may include five second-first holes being disposed in the first side plate 1220*a*. The length of the first side plate 1220*a* in a direction perpendicular to the optical axis direction may be 1.5 to 2.5 times the total length of the five second-first holes in the corresponding direction. For example, it may be 2 times. The length of the first side plate 1220*a* in an optical axis direction may be 2 times the length of the second-first hole in the corresponding direction. The cross-sectional area of the first side plate 1220*a* may be 3 to 5 times the total cross-sectional area of the five second-first holes. For example, it may be 4 times. At this time, the cross-sectional area may mean a cross-sectional area calculated by assuming a square plate in which the second-first hole of the first side plate 1220*a* is not formed. That is, the cross-sectional area of the first side plate 1220*a* may be calculated excluding the second-first hole. However, it is not limited thereto, and the second holes 1222 may be formed in various sizes and numbers in order to maximize the exposure area of the second shield can 1360.

The second body 1200 may include a connector lead-out part 1230. The connector lead-out part 1230 may be coupled to the bottom plate 1210. The connector lead-out part 1230 may be disposed in the third hole 1212 of the bottom plate 1210. The connector lead-out part 1230 may penetrate through the third hole 1212 of the bottom plate 1210. The connector lead-out part 1230 may have a connector 1460 being disposed therein. The connector lead-out part 1230 may be formed of a plastic material. The connector lead-out part 1230 may include a first portion being protruded above the bottom plate 1210. The connector lead-out part 1230 may include a second portion that also being protruded below the bottom plate 1210. The first portion and the second portion of the connector lead-out part 1230 may be integrally formed. The length of the first portion of the connector lead-out part 1230 in an optical axis direction may be smaller than the length of the second portion of the connector lead-out part 1230 in an optical axis direction. The length of the first portion in an optical axis direction may correspond to the thickness of the bottom plate of the second shield can 1360. The upper surface of the first portion may be disposed on the same plane as the upper surface of the bottom plate of the second shield can 1360. The connector lead-out part 1230 may include a hole 1231. A connector 1460 may be disposed in the hole 1231. The hole 1231 may accommodate at least a portion of the connector 1460. Through this, the connector lead-out part 1230 may fix the connector 1460.

The camera module 20 may include a second shield can 1360. The second shield can 1360 may be formed of a metal material. The second shield can 1360 may include: a bottom plate 1370; a side plate 1380 being extended from the bottom plate 1370; and corners 1390 being disposed in the plurality of side plates 1380. The bottom plate 1370, the side plate 1380, and the corner 1390 may be integrally formed. The bottom plate 1370 may be in contact with the bottom plate 1210 of the second body 1200.

The bottom plate 1370 may include a hole 1371. The hole 1371 may be formed in a shape corresponding to the third hole 1212 of the second body 1200. The hole 1371 may be formed to have a size corresponding to the third hole 1212 of the second body 1200. At least a portion of the connector lead-out part 1230 may be disposed in the hole 1371. The connector lead-out part 1230 may penetrate through the hole 1371. The inner circumferential surface of the hole 1371 may be in contact with at least a portion of the outer circumferential surface of the connector lead-out part 1230. At least a portion of the connector 1460 may be disposed in the hole 1371. The connector 1460 may be penetrated through the hole 1371.

The side plate 1380 may comprise: a first side plate 1381; a second side plate 1382; a third side plate 1383 being disposed at an opposite side of the first side plate 1381; and a fourth side plate 1384 being disposed at an opposite side of the second side plate 1382. The outer side surface of the first side plate 1381 may be in contact with an inner side surface of the first side plate 1220*a* of the second body 1200. The outer side surface of the second side plate 1382 may be in contact with an inner side surface of the second side plate 1220*b* of the second body 1200. The outer side surface of the third side plate 1383 may be in contact with an inner side surface of the third side plate 1220*c* of the second body 1200. The outer side surface of the fourth side plate 1384 may be in contact with an inner side surface of the fourth side plate 1220*d* of the second body 1200.

The side plate 1380 may include: a first side plate 1381; and a first corner 1391 being disposed on the second side plate 1382; a second corner 1392 being disposed between the second side plate 1382 and the third side plate 1383; a third corner 1393 being disposed between the third side plate 1383 and the fourth side plate 1384; and a fourth corner 1394 being disposed between the fourth side plate 1384 and the first side plate 1381. An outer circumferential surface of the first corner 1391 may be in contact with an inner circumferential surface of the first corner 1220*e* of the second body 1200. An outer circumferential surface of the second corner 1392 may be in contact with an inner circumferential surface of the second corner 1220*f* of the second body 1200. An outer circumferential surface of the third corner 1393 may be in contact with an inner circumferential surface of the third corner 1220*g* of the second body 1200. An outer circumferential surface of the fourth corner 1394 may be in contact with an inner circumferential surface of the fourth corner 1220*h* of the second body 1200. The second shield can 1360 may be grounded with the second substrate 1420. The outer surfaces of the second shield can 1360 and the connector 1460 may be grounded.

The second shield cover 1360 may be coupled to the second body 1200 in a way that waterproofing is possible. Depending on the use, waterproofing may satisfy IP52 or higher for waterproof and dustproof, and if it is installed outside of a vehicle, it may satisfy IP69K.

The second shield can 1360 may be integrally formed by forming a metal. That is, the bottom plate 1370, the side plate 1380, and the corner 1390 of the second shield can 1360 may be integrally formed by molding metal.

The second shield can 1360 may be treated with a metal surface. The second shield can 1360 may be pre-treated. A bonding surface of the second shield can 1360 with the second body 1200 may be treated with a metal surface. The bonding surface of the second shield can 1360 with the second body 1200 may be pre-treated. The second shield can 1360 may undergo a pretreatment process of the metal surface before insert injection into the second body 1200. The second shield can 1360 may be formed of aluminum. At least a portion of the second shield can 1360 may be formed of aluminum. The second shield can 1360 may be formed of a metal material having high thermal conductivity. The pretreatment or metal surface treatment may refer to a process of removing oil attached to the metal surface and forming a coating layer or a surface treatment layer. When the bonding surface of the second shield can 1360 with the second body 1200 is immersed in a special solution for a certain time, nano-sized pores S on the bonding surface of the second shield can 1360 with the second body 1200 can be formed. Through this, a portion of the second body 1200 made of plastic is melted by the heat generated during the insert injection process of the second shield can 1360 and the second body 1200 and may flow into the pores S of the second shield can 1360. In this case, the bonding force, the coupling force, and the adhesion force between the second shield can 1360 and the second body 1200 may be increased. In addition, if the bonding surface of the second shield can 1360 with the second body 1200 is immersed in a special solution for a certain period of time, the coating layer C or the film layer on the bonding surface of the second shield can 1360 with the second body 1200 can be formed. Through this, it is possible to prevent the interfacial separation phenomenon between the bonding surface of the second shield can 1360 and the second body 1200. In addition, waterproofing between the second shield can 1360 and the second body 1200 may be possible without a separate waterproof member or sealing member.

The second shield can 1360 may be fixed to the second body 1200 through insert molding. The second shield can 1360 may be fixed to the second body 1200 through insert molding. Insert injection or insert molding may refer to a molding method in which a metal member and a plastic member are integrated. A portion of the second body 1200 may be melted by the heat generated during the insert injection process and introduced into the pores S generated during the pretreatment of the second shield can 1360.

The camera module 20 may include a substrate assembly 1400. The substrate assembly 1400 may be disposed inside the second body 1200. The substrate assembly 1400 may be disposed in an internal space formed by coupling the first body 1100 and the second body 1300. The substrate assembly 1400 may be disposed inside the second shield can 1360.

The substrate assembly 1400 may include a first substrate 1410. The first substrate 1410 may include a printed circuit board. The first substrate 1410 may include a rigid printed circuit board. An image sensor 1412 may be disposed in the first substrate 1410. At this time, the first substrate 1410 may be referred to as a sensor substrate. The first substrate 1410 may include a first surface facing the body part 1100 of the first body 1100 and a second surface being disposed at an opposite side of a first surface. The image sensor 1412 may be disposed in the first surface of the first substrate 1410. The first substrate 1410 may be coupled to the first body 1100. The first substrate 1410 may be coupled to the first protruded portion 1113 of the first body 1100. An outer edge of the first surface of the first substrate 1410 may be coupled to the first protruded portion 1113 of the first body 1100.

The substrate assembly 1400 may include a second substrate 1420. The second substrate 1420 may include a printed circuit board. The second substrate 1420 may include a rigid printed circuit board. The second substrate 1420 may be disposed below the first substrate 1410. The second substrate 1420 may be spaced apart from the first substrate 1410. The second substrate 1420 may be spaced apart from the first substrate 1410 in an optical axis direction. The second substrate 1420 may supply power to the first substrate 1410. The second substrate 1420 may be disposed parallel to the first substrate 1410. The second substrate 1420 may be electrically connected to the connector 1460. The second substrate 1420 may include a first surface facing the first substrate 1410 and a second surface being disposed at an opposite side of a second surface. A connector 1460 may be disposed in a second surface of the second substrate 1420.

The substrate assembly 1400 may include a third substrate 1430. The third substrate 1430 may include a flexible printed circuit board (FPCB). The third substrate 1430 may electrically connect the first substrate 1410 and the second substrate 1420. One end of the third substrate 1430 is connected to the first substrate 1410, and the other end of the third substrate 1430 may be connected to the second substrate 1420. The third substrate 1430 may have elasticity.

The substrate assembly 1400 may include a spacer 1450. The spacer 1450 may be referred to as a shield can. The spacer 1450 may be referred to as an electromagnetic wave shielding member. The spacer 1450 may block electromagnetic interference (EMI) or electromagnetic waves. The spacer 1450 may serve to separate the plurality of substrates from one another. The spacer 1450 may be formed of a metal material.

The spacer 1450 may include a body part 1451. The body part 1451 may include a plurality of body parts 1451. The body part 1451 may include: a first body part 1451*a*; a second body part 1451*b*; a third body part 1451*c* being disposed at an opposite side of the first body part 1451*a*; a fourth body part 1451*d* being disposed at an opposite side of second body part 1451*b*. The first to fourth body parts 1451*a*, 1451*b*, 1451*c*, and 1451*d* may be spaced apart from one another, except for a connection part 1456, which will be described later.

The body part 1451 may include a first protrusion 1452 being formed on the upper end of the body part 1451. The first protrusion 1452 may include two protrusions 1452 being spaced apart from each other. The first protrusion 1452 may be disposed in the second surface of the first substrate 1410. The body part 1451 may include a groove 1453 being formed between the first protrusions 1452. The width of the groove 1453 being formed between the two first protrusions 1452 of the first body part 1451*a* may be formed larger than the width of a groove 1453 being formed between the two first protrusions 1452 of the second to fourth body parts 1451*b*, 1451*c*, and 1451*d*. Through this, the third substrate 1430 may pass through the groove 1453 formed in the first body part 1451*a* to electrically connect the first substrate 1410 and the second substrate 1420.

The spacer 1450 may include a first coupling part 1454. The first coupling part 1454 may be formed at a lower end of each of the second body part 1451*b* and the fourth body part 1451*d*. The first coupling part 1454 may be protruded downward from at least a partial area of the lower ends of the second body part 1451*b* and the fourth body part 1451*d*.

The first coupling part 1454 may include a first hole 1454*a*. The first hole 1454*a* of the first coupling part 1454 being formed in the second body part 1451*b* may be overlapped with the first hole 1454*a* of the first coupling part 1454 being formed in the fourth body part 1451*d* in a direction perpendicular to the direction of the optical axis. In the first hole 1454*a*, which will be described later, at least a portion of the second protrusion 1454*c* may be disposed. The first hole 1454*a* may be formed to prevent interference with the second protrusion 1454*c*.

The first coupling part 1454 may include a second hole 1454*b*. The second hole 1454*b* of the first coupling part 1454 being formed in the second body part 1451*b* may be overlapped with the second hole 1454*b* of the first coupling part 1454 being formed in the fourth body part 1451*d* in a direction perpendicular to the direction of the optical axis. The second hole 1454*b*, which will be described later, may be formed to create a third protrusion 1454*d*. The second hole 1454*b* may be spaced apart from the first hole 1454*a*.

The first coupling part 1454 may include a second protrusion 1454*c*. The second protrusion 1454*c* of the first coupling part 1454 formed in the second body part 1451*b* may be overlapped with the second protrusion 1454*c* of the first coupling part 1454 being formed in the fourth body part 1451*d* in a direction perpendicular to the direction of the optical axis. The second protrusion 1454*c* may be formed by being bent from a portion of a lower end of the first coupling part 1454. The second protrusion 1454*c* may include a bent portion for supporting the second surface of the second substrate 1420. An end portion of the bent portion of the second protrusion 1454*c* may be disposed in the first hole 1454*a*. The second substrate 1420 may be fixed to the spacer 1450 through the second protrusion 1454*c*.

The first coupling part 1454 may include a third protrusion 1454*d*. The third protrusion 1454*d* may be formed by cutting a partial area of the first coupling part 1454 and pressing the cut area outward. At this time, the cut area may be the second hole 1454*b*. The third protrusion 454*d* of the first coupling part 454 formed in the second body part 1451*b* may overlap may be overlapped with the third protrusion 1454*d* of the first coupling part 1454 being formed in the fourth body part 1451*d* in a direction perpendicular to the direction of the optical axis. The third protrusion 1454*d* may include a first area being extended inclinedly with respect to the first coupling part 1454 and a second area being extended parallel to the first coupling part 1454 from the first area.

The spacer 1450 may include a second coupling part 1455. The second coupling part 1455 may be extended downward from a lower end of the third body part 1451*c*.

The second coupling part 1455 may be extended downward from a partial area of a lower end of the third body part 1451*c*. The second coupling part 1455 may include a third hole 1455*a*. A portion of the second substrate 1420 may be disposed in the third hole 1455*a*. A portion of the second substrate 1420 may be fit-coupled into the third hole 1455*a* to fix the second substrate 1420.

The spacer 1450 may include a connection part 1456. The connection part 1456 may connect the first to fourth body parts 1451*a*, 1451*b*, 1451*c*, and 1451*d*. The connection part 1456 may include a curved surface. The connection part 1456 may be disposed in a first surface of the second substrate 1420. The connection part 1456 may press the second substrate 1420 downward, and the second protrusion 1454*c* may press the second substrate 1420 upward to fix the second substrate 1420.

The spacer 1450 may be disposed inside the second shield can 1360. The spacer 1450 may be spaced apart from the second shield can 1360. The spacer 1450 may be spaced apart from the bottom plate 1370 of the second shield can 1360 in an optical axis direction. The spacer 1450 may be spaced apart from the side plate 1380 of the second shield can 1360 in a direction perpendicular to the optical axis direction. The spacer 1450 may be formed of a metal material. The thickness of the spacer 1450 may be thinner than the thickness of the side plate 1380 of the second shield can 1360. The spacer 1450 may face the side plate 1380 of the second shield can 1360.

The substrate assembly 1400 may include a connector 1460. The connector 1460 may be disposed in a second surface of the second substrate 1420. The connector 1460 may be fixed to a second surface of the second substrate 1420. The connector 1460 may be electrically connected to the second substrate 1420. A portion of the connector 1460 may be disposed inside the second shield can 1360, and the remaining portion may be disposed inside the connector lead-out part 1230 of the second body 1200. The connector 1460 may penetrate through the hole 1311 of the second shield can 1360. The connector 1460 may penetrate through the third hole 1212 of the second body 1200.

The camera module 20 may include a first shield can 1310. The first shield can 1310 may be formed of a metal material. The first shield can 1310 may be disposed to face the first substrate 1410 in an optical axis direction. The first shield can 1310 may be disposed between the barrel 1120 and the lens 1130 and the first substrate 1410. The first shield can 1310 may be disposed inside the space portion 1110*a*.

The first shield can 1310 may include a lower plate 1320 and an upper plate 1330 being disposed at an upper portion of the lower plate 1320. The lower plate 1320 and the upper plate 1330 may be disposed to have a step in an up and down direction. The lower plate 1320 may be disposed below the upper plate 1330 with respect to the optical axis direction. The upper plate 1330 may be disposed at an outer side of the lower plate 1320 in a direction perpendicular to the optical axis direction. The lower plate 1320 and the upper plate 1330 may be connected through a side plate 1340. The lower end of the side plate 1340 is connected to an end portion at an outer side of the lower plate 1320, and the upper end of the side plate 1340 may be connected to an end portion at an inner side of the upper plate 1330. Accordingly, the first shield can 1310 may have an area bent at least once. For example, the upper plate 1330 and the lower plate 1320 may be disposed parallel to each other, and the side plate 1340 may be disposed perpendicular to the upper plate 1330 or the lower plate 1320. The area connecting the upper plate 1330 and the side plate 1340, and the area connecting the lower plate 1320 and the side plate 1340 may be rounded.

The lower plate 1320 may be disposed to face the lower surface of the lens 1130 or the lower surface of the barrel part 1120. A portion of the upper surface of the lower plate 1320 may be in contact with a lower surface of the lens 1130 or a lower surface of the barrel part 1120. The lower plate 1320 may include a penetrating hole 1322 penetrating the lower surface from the upper surface. The lens 1130 and the image sensor 1412 may face each other in an optical axis direction through the penetrating hole 1322.

The upper plate 1330 is connected to the lower plate 1320 through the side plate 1340, and may be disposed at an outer side of the lower plate 1320. The upper plate 1330 may be disposed to have a step with respect to the lower plate 1320 in an optical axis direction. The upper plate 1330 may form an edge of the first shield can 1310. The upper plate 1330 may be coupled to the first body 1100. A coupling groove 1117 may be formed at an inner surface of the body part 1110 so that the upper plate 1330 is coupled thereto. The coupling groove 1117 may be formed as a portion of the inner surface of the first protruded portion 1113 is being recessed to the outside. The coupling groove 1117 may be formed as a portion of the inner surface of the space portion 1110a is being recessed to the outside. The upper plate 1330 may be disposed inside the coupling groove 1117.

The upper plate 1330 is connected to the lower plate 1320 through the side plate 1340, and may be disposed at an outer side of the lower plate 1320. The upper plate 1330 may be disposed to have a step with respect to the lower plate 1320 in an optical axis direction. The upper plate 1330 may form an edge of the first shield can 1310. The upper plate 1330 may be coupled to the first body 1100. A coupling groove 1117 may be formed at an inner surface of the body part 1110 so that the upper plate 1330 is coupled thereto. The coupling groove 1117 may be formed as a portion of the inner surface of the first protruded portion 1113 is being recessed to the outside. The coupling groove 1117 may be formed as a portion of the inner surface of the space portion 1110a is being recessed to the outside. The upper plate 1330 may be disposed in the coupling groove 1117.

The first shield can 1310 may be integrally formed by molding a metal. The upper plate 1330, the side plate 1340, and the lower plate 1320 of the first shield can 1310 may be integrally formed by molding a metal.

The first shield can 1310 may be treated with a metal surface. The first shield can 1310 may be pre-processed. The bonding surface of the first shield can 1310 with the first body 1100 may be treated with a metal surface. The bonding surface of the first shield can 1310 with the first body 1100 may be pretreated. The first shield can 1310 may undergo a pretreatment process of the metal surface before insert injection into the first body 1100. The first shield can 1310 may be formed of aluminum. At least a portion of the first shield can 1310 may be formed of aluminum. The first shield can 1310 may be formed of a metal material having high thermal conductivity. The pretreatment or metal surface treatment may refer to a process of removing oil attached to the metal surface and forming a coating layer or a surface treatment layer. At this time, the surface treatment layer may mean a higher concept including a coating layer C or a coating layer. The surface treatment layer may include a coating layer C. The surface treatment layer may include a coating layer. When the bonding surface of the first shield can 1310 with the first body 1100 is immersed in a special solution for a certain period of time, nano-sized pores S on the bonding surface with the first body 1100 of the first shield can 1310 may be formed. Through this, a portion of the first body 1100 made of plastic is melted by the heat generated during the insert injection process of the first shield can 1310 and the first body 1100 and may flow into the pores S of the first shield can 1310. In this case, coupling force, bonding force, and adhesive force between the first shield can 1310 and the first body 1100 may be increased. In addition, if the bonding surface of the first shield can 1310 with the first body 1100 is immersed in a special solution for a certain period of time, a coating layer C or a film layer may be formed on the bonding surface of the first shield can 1310 with the second body 1100. Through this, an interfacial separation phenomenon between the bonding surface of the first shield can 1310 and the first body 1100 can be prevented. In addition, waterproofing between the first shield can 1310 and the first body 1100 may be possible without a separate waterproof member or sealing member.

The first shield can 1310 may be fixed to the first body 1100 through insert molding. The first shield can 1310 may be fixed to the first body 1100 through insert molding. Insert injection or insert molding may refer to a molding method in which a metal member and a plastic member are integrated. A portion of the first body 1100 may be melted by heat generated during the insert injection process and may be introduced into the pores S generated during the pretreatment process of the first shield can 1310.

A hole 1112 may be formed in an upper surface of the body part 1110 to penetrate through the upper and lower surfaces to expose the first shield can 1310 to the outside. The upper plate 1330 of the first shield can 1310 may be exposed upward through the hole 1112. Accordingly, heat generated in the camera module 20 may be easily discharged to the outside.

In detail, an edge portion 1111 may be disposed in an upper surface edge of the body part 1110. The edge portion 1111 may be formed to be protruded upward from other areas of the upper surface of the body part 1110 being disposed inside. The hole 1112 may be disposed between the edge portion 1111 and a lower end of the barrel part 1120. A plurality of holes 1112 may be provided to be spaced apart from one another. A connection part 1114 connecting the edge portion 1111 and the lower end of the barrel part 1120 may be disposed between the plurality of holes 1112. The plurality of holes 1112 may be spaced apart from one another through the connection part 1114. The plurality of holes 1112 may be disposed along the circumference of the barrel part 1120.

The holes 1112 may be respectively disposed in four corner areas of the body part 1110. The hole 1112 may be shaped to interconnect adjacent sides on the upper surface of the body part 1110. In detail, the hole 1112 may include: a first hole 1112a forming a first side; a second hole 1112b forming a second side adjacent to the first side; and a third hole 1112c that connects the first hole 1112a and the second hole 1112b and forms a corner. The first to third holes 1112a, 1112b, and 1112c may communicate with one another. The first hole 1112a and the second hole 1112b may be disposed perpendicular to each other.

Figure 32:
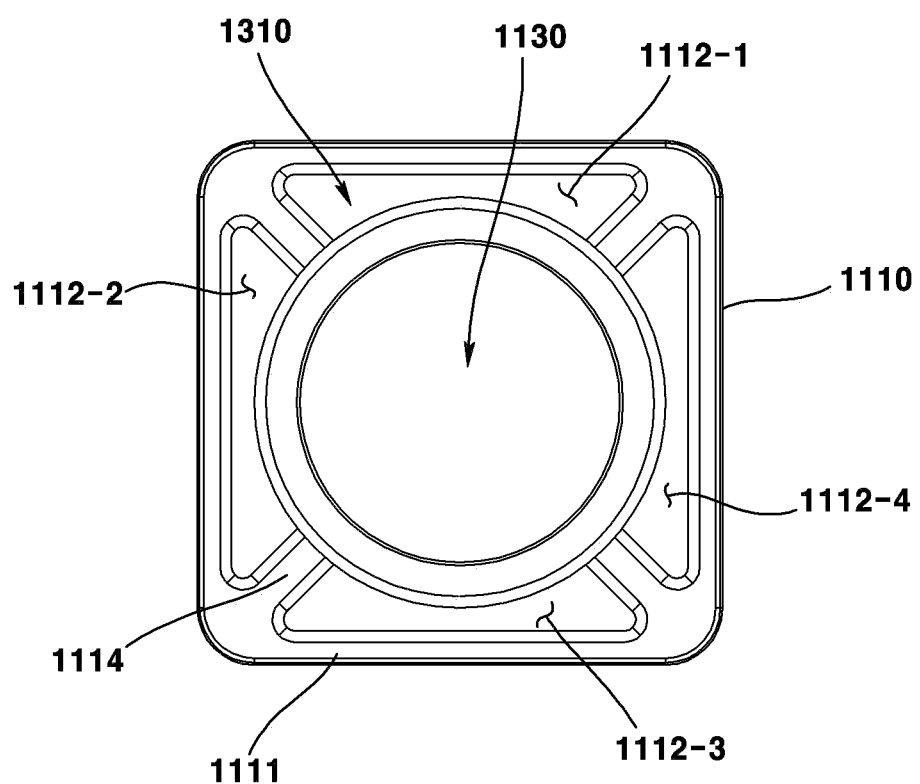
FIG. 32 is a modified example of a hole inside a camera module according to a second embodiment of the present invention.

FIG. 32 is a modified example of a hole inside a camera module according to a second embodiment of the present invention.

Referring to FIG. 32, a plurality of first holes 1112 may be provided along the circumference of the barrel part 1120 between the lower end of the barrel part 1120 and the edge portion 1111. FIG. 32 illustrates that the first hole 1112 includes: a first-first hole 1112-1 forming a first side; a first-second hole 1112-2 forming a second side; a first-third hole 1112-3 forming the third side; and a first-fourth hole forming the fourth side 1112-4, respectively. The first-first hole 1112-1 may be disposed to face the first-third hole 1112-3 about the barrel part 1120. The first-second hole 1112-2 may be disposed to face the first-fourth hole 1112-4 about the barrel part 1120. The first-first hole 1112-1 may be vertically disposed with respect to the first-second hole 1112-2 or the first-fourth hole 1112-4. The first-second hole 1112-2 may be vertically disposed with respect to the first-first hole 1112-1 or the first-third hole 1112-3.

In this case, the connection part 1114 connecting the edge portion 1111 and the lower end of the barrel part 1120 may be disposed in an area forming each corner of the body part 1110.

According to the structure as described above, it is possible to provide a plastic body structure capable of maximizing heat dissipation.

In addition, by assembling a metal shield can and a plastic body by insert injection, it is possible to minimize the assembly man-hours and reduce costs.

In addition, interfacial separation between the shield can and the body can be prevented through a pretreatment process on the shield can, thereby maximizing the waterproof performance.

In addition, by forming a hole for exposing the shield can inside the body to the outside, it is possible to effectively radiate the heat inside the camera module to the outside.

The embodiments of the present invention have been described above with reference to the accompanying drawings, but a person skilled in the art to which the present invention belongs may understand that the present invention can be implemented in other specific forms without changing the technical spirit or essential features. Therefore, it should be understood that the embodiments described above are illustrative and non-limiting in all respects.

The invention claimed is:

1. A camera module comprising:
a first body including an upper plate and a side plate, the side plate of the first body extending from the upper plate of the first body;
a second body coupled to the first body;
a lens module, at least a portion of the lens module located inside the first body;
a first shield cover coupled to the first body; and
a substrate assembly located inside the second body,
wherein at least a portion of the first shield cover is located higher than the upper plate of the first body and exposed to an outside of the camera module,
wherein the first shield cover includes an upper plate and a side plate, the side plate of the first shield cover extending from the upper plate of the first shield cover,
wherein the side plate of the first shield cover includes a first portion coupled to the upper plate of the first body, and a second portion extending upwardly from the first portion, and
wherein the second portion of the first shield cover does not overlap with the upper plate of the first body in a direction perpendicular to an optical axis direction.

2. The camera module according to claim 1, wherein a length of the first portion of the first shield cover in the optical axis direction is shorter than a length of the second portion of the first shield cover in the optical axis direction.

3. The camera module according to claim 1, wherein the first portion of the side plate of the first shield cover is coupled to the first body by insert injection.

4. The camera module according to claim 1, wherein the first body includes a coupling portion protruding upward from the upper plate of the first body, and
wherein the coupling portion of the first body is located in the second portion of the side plate of the first shield cover.

5. The camera module according to claim 4, wherein the coupling portion of the first body includes a first area having a first width in a direction perpendicular to the optical axis direction, and a second area extending upward from the first area and having a second width smaller than the first width.

6. The camera module according to claim 4, wherein the coupling portion of the first body is coupled to the second portion of the first shield cover by insert injection.

7. The camera module according to claim 5, wherein the second area of the coupling portion of the first body includes a plurality of second areas,
wherein the side plate of the first shield cover is provided as a plurality of side plates,
wherein the coupling portion of the first body includes a groove located between the plurality of second areas, and
wherein the groove of the coupling portion of the first body is located at a corner located between adjacent side plates of the plurality of side plates of the first shield cover.

8. The camera module according to claim 1, wherein the first shield cover is formed of a metal material, and
wherein the first body is formed of a plastic material.

9. A camera module comprising:
a first body including an upper plate and a side plate, the side plate of the first body extending from the upper plate of the first body;
a second body coupled to the first body;
a lens module, at least a portion of the lens module located inside the first body;
a first shield cover coupled to the first body;
a substrate assembly located inside the second body; and
a second shield cover located inside the second body,
wherein at least a portion of the first shield cover is located higher than the upper plate of the first body and exposed to an outside of the camera module,
wherein the second shield cover includes a bottom plate and a side plate, the side plate of the second shield cover extending from the bottom plate of the second shield cover, and
wherein a thickness of the side plate of the first shield cover in a direction perpendicular to an optical axis direction is greater than a thickness of the side plate of the second shield cover in a corresponding direction.

10. The camera module according to claim 9, wherein the second shield cover is spaced apart from the first shield cover in the optical axis direction.

11. The camera module according to claim 9, wherein the side plate of the second shield cover includes a protruding portion that protrudes above the second body, and
wherein the protruding portion of the second shield cover is located in the first body.

12. The camera module according to claim 9, wherein the second body includes a hole, and
wherein at least a portion of the second shield cover is exposed by the hole of the second body.

13. The camera module according to claim 9, wherein the second shield cover is in direct contact with an inner surface of the second body and is adhered to the inner surface of the second body.

14. A camera module comprising:
a first body including an upper plate and a side plate, the side plate of the first body extending from the upper plate of the first body;
a second body coupled to the first body;
a lens module, at least a portion of the lens module located inside the first body;
a first shield cover coupled to the first body; and
a substrate assembly located inside the second body,
wherein at least a portion of the first shield cover is located higher than the upper plate of the first body and exposed to an outside of the camera module,
wherein the substrate assembly include a first substrate coupled to a lower end of the first shield cover, a second substrate disposed under the first substrate, a spacer disposed between the first substrate and the second substrate, and a third substrate electrically connecting the first substrate and the second substrate, and
wherein a thickness of the first shield cover in a direction perpendicular to an optical axis direction is greater than a thickness of the spacer in a corresponding direction.

15. A camera module comprising:
a first body comprising a top plate and a side plate, the side plate extending from the top plate;
a second body coupled to the first body;
a lens module at least partially disposed in the first body;
a first shield cover coupled to the first body; and
a substrate assembly located inside the second body,
wherein the first shield cover includes a first portion coupled to an upper plate of the first body, and a second portion extending upwardly from the first portion,
wherein the second portion of the first shield cover is exposed to an outside of the camera module, and
wherein a length of the second portion of the first shield cover in an optical axis direction is longer than a length of the first portion of the first shield cover in the optical axis direction.

16. The camera module according to claim 15, wherein the first portion of the first shield cover is insert-extruded with the first body.

17. The camera module according to claim 15, further comprising a second shield cover located in the second body and in contact with an inner surface of the second body,
wherein the first shield cover includes an upper plate and a side plate, the side plate extending downwardly from the upper plate, and
wherein a thickness of the side plate of the first shield cover in a direction perpendicular to the optical axis direction is greater than a thickness of the second shield cover in a corresponding direction.

18. A camera module comprising:
a first body comprising a top plate and a side plate, the side plate extending from the top plate;
a second body coupled to the first body;
a lens module at least partially disposed in the first body;
a first shield cover coupled to the first body; and
a substrate assembly located inside the second body,
wherein the first shield cover includes a first portion coupled to an upper plate of the first body, and a second portion extending upwardly from the first portion,
wherein the second portion of the first shield cover is located at a higher position than the first body, and
wherein the first portion of the first shield cover is insert-extruded with the first body.

* * * * *